(12) United States Patent
Vorbach

(10) Patent No.: US 8,069,373 B2
(45) Date of Patent: *Nov. 29, 2011

(54) METHOD FOR DEBUGGING RECONFIGURABLE ARCHITECTURES

(76) Inventor: Martin Vorbach, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/354,590

(22) Filed: Jan. 15, 2009

(65) Prior Publication Data

US 2009/0150725 A1     Jun. 11, 2009

Related U.S. Application Data

(63) Continuation of application No. 10/487,687, filed on Aug. 25, 2004, now Pat. No. 7,480,825.

(30) Foreign Application Priority Data

| Sep. 3, 2001 | (DE) | ................... | 101 42 894 |
| Sep. 3, 2001 | (DE) | ................... | 101 42 904 |
| Sep. 11, 2001 | (DE) | ................... | 101 44 733 |
| Sep. 17, 2001 | (DE) | ................... | 101 45 795 |
| Nov. 5, 2001 | (DE) | ................... | 101 54 259 |
| Jan. 19, 2002 | (DE) | ................... | 102 02 044 |
| Jan. 20, 2002 | (DE) | ................... | 102 02 175 |
| Feb. 18, 2002 | (DE) | ................... | 102 06 856 |
| Feb. 21, 2002 | (DE) | ................... | 102 07 226 |
| Aug. 27, 2002 | (DE) | ................... | 102 40 022 |

(51) Int. Cl.
*G06F 11/00* (2006.01)
(52) U.S. Cl. ...................... 714/38.1; 717/124
(58) Field of Classification Search .................. None
See application file for complete search history.

(56) References Cited

U.S. PATENT DOCUMENTS

| 2,067,477 A | 1/1937 | Cooper |
| 3,242,998 A | 3/1966 | Gubbins |
| 3,564,506 A | 2/1971 | Bee et al. |
| 3,681,578 A | 8/1972 | Stevens |
| 3,753,008 A | 8/1973 | Guarnaschelli |
| 3,757,608 A | 9/1973 | Willner |
| 3,855,577 A | 12/1974 | Vandierendonck |
| 4,151,611 A | 4/1979 | Sugawara et al. |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |

(Continued)

FOREIGN PATENT DOCUMENTS

DE            42 21 278            1/1994

(Continued)

OTHER PUBLICATIONS

Guccione et al., "JBits based interface for reconfigurable computing", 1999.*

(Continued)

*Primary Examiner* — Gabriel Chu

(74) *Attorney, Agent, or Firm* — Kenyon & Kenyon LLP

(57) ABSTRACT

A method for debugging reconfigurable hardware is described. According to this method, all necessary debug information is written in each configuration cycle into a memory, which is then analyzed by the debugger.

22 Claims, 6 Drawing Sheets

U.S. PATENT DOCUMENTS

| | | |
|---|---|---|
| 4,591,979 A | 5/1986 | Iwashita |
| 4,594,682 A | 6/1986 | Drimak |
| 4,623,997 A | 11/1986 | Tulpule |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,873,666 A | 10/1989 | Lefebvre et al. |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,939,641 A | 7/1990 | Schwartz et al. |
| 4,959,781 A | 9/1990 | Rubinstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,036,473 A | 7/1991 | Butts et al. |
| 5,036,493 A | 7/1991 | Nielsen |
| 5,041,924 A | 8/1991 | Blackborow et al. |
| 5,043,978 A | 8/1991 | Nagler et al. |
| 5,047,924 A | 9/1991 | Matsubara et al. |
| 5,055,997 A | 10/1991 | Sluijter et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,119,290 A | 6/1992 | Loo et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A * | 6/1995 | Liu et al. ................. 714/735 |
| 5,426,378 A | 6/1995 | Ong |
| 5,428,526 A | 6/1995 | Flood et al. |
| 5,430,687 A | 7/1995 | Hung et al. |
| 5,435,000 A | 7/1995 | Boothroyd et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,568,624 A | 10/1996 | Sites et al. |
| 5,570,040 A | 10/1996 | Lytle et al. |
| 5,572,710 A | 11/1996 | Asano et al. |
| 5,574,930 A | 11/1996 | Halverson, Jr. et al. |
| 5,581,731 A | 12/1996 | King et al. |
| 5,581,734 A | 12/1996 | DiBrino et al. |
| 5,583,450 A | 12/1996 | Trimberger et al. |

| Patent No. | Date | Inventor |
|---|---|---|
| 5,584,013 A | 12/1996 | Cheong et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,597 A | 2/1997 | Kean et al. |
| 5,600,845 A | 2/1997 | Gilson |
| 5,606,698 A | 2/1997 | Powell |
| 5,608,342 A | 3/1997 | Trimberger |
| 5,611,049 A | 3/1997 | Pitts |
| 5,617,547 A | 4/1997 | Feeney et al. |
| 5,617,577 A | 4/1997 | Barker et al. |
| 5,619,720 A | 4/1997 | Garde et al. |
| 5,625,806 A | 4/1997 | Kromer |
| 5,625,836 A | 4/1997 | Barker et al. |
| 5,627,992 A | 5/1997 | Baror |
| 5,634,131 A | 5/1997 | Matter et al. |
| 5,635,851 A | 6/1997 | Tavana |
| 5,642,058 A | 6/1997 | Trimberger et al. |
| 5,646,544 A | 7/1997 | Iadanza |
| 5,646,545 A | 7/1997 | Trimberger et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,656,950 A | 8/1997 | Duong et al. |
| 5,657,330 A | 8/1997 | Matsumoto |
| 5,659,785 A | 8/1997 | Pechanek et al. |
| 5,659,797 A | 8/1997 | Zandveld et al. |
| 5,675,262 A | 10/1997 | Duong et al. |
| 5,675,743 A | 10/1997 | Mavity |
| 5,675,757 A | 10/1997 | Davidson et al. |
| 5,675,777 A | 10/1997 | Glickman |
| 5,680,583 A | 10/1997 | Kuijsten |
| 5,682,491 A | 10/1997 | Pechanek et al. |
| 5,687,325 A | 11/1997 | Chang |
| 5,694,602 A | 12/1997 | Smith |
| 5,696,791 A | 12/1997 | Yeung |
| 5,696,976 A | 12/1997 | Nizar et al. |
| 5,701,091 A | 12/1997 | Kean |
| 5,705,938 A | 1/1998 | Kean |
| 5,713,037 A | 1/1998 | Wilkinson et al. |
| 5,717,890 A | 2/1998 | Ichida et al. |
| 5,717,943 A | 2/1998 | Barker et al. |
| 5,732,209 A | 3/1998 | Vigil et al. |
| 5,734,869 A | 3/1998 | Chen |
| 5,734,921 A | 3/1998 | Dapp et al. |
| 5,737,516 A | 4/1998 | Circello et al. |
| 5,737,565 A | 4/1998 | Mayfield |
| 5,742,180 A | 4/1998 | Detton et al. |
| 5,745,734 A | 4/1998 | Craft et al. |
| 5,748,872 A | 5/1998 | Norman |
| 5,748,979 A | 5/1998 | Trimberger |
| 5,752,035 A | 5/1998 | Trimberger |
| 5,754,459 A | 5/1998 | Telikepalli |
| 5,754,820 A | 5/1998 | Yamagami |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Timberger et al. |
| 5,781,756 A | 7/1998 | Hung |
| 5,784,636 A | 7/1998 | Rupp |
| 5,794,059 A | 8/1998 | Barker et al. |
| 5,794,062 A | 8/1998 | Baxter |
| 5,801,547 A | 9/1998 | Kean |
| 5,801,715 A | 9/1998 | Norman |
| 5,801,958 A | 9/1998 | Dangelo et al. |
| 5,802,290 A | 9/1998 | Casselman |
| 5,804,986 A | 9/1998 | Jones |
| 5,815,004 A | 9/1998 | Trimberger et al. |
| 5,815,715 A | 9/1998 | Kayhan |
| 5,815,726 A | 9/1998 | Cliff |
| 5,821,774 A | 10/1998 | Veytsman et al. |
| 5,828,229 A | 10/1998 | Cliff et al. |
| 5,828,858 A | 10/1998 | Athanas et al. |
| 5,831,448 A | 11/1998 | Kean |
| 5,832,288 A | 11/1998 | Wong |
| 5,838,165 A | 11/1998 | Chatter |
| 5,841,973 A | 11/1998 | Cooke et al. |
| 5,844,422 A | 12/1998 | Trimberger et al. |
| 5,844,888 A | 12/1998 | Narjjyka |
| 5,848,238 A | 12/1998 | Shimomura et al. |
| 5,854,918 A | 12/1998 | Baxter |
| 5,857,097 A | 1/1999 | Henzinger et al. |
| 5,857,109 A | 1/1999 | Taylor |
| 5,859,544 A | 1/1999 | Norman |
| 5,860,119 A | 1/1999 | Dockser |
| 5,862,403 A | 1/1999 | Kanai et al. |
| 5,865,239 A | 2/1999 | Carr |
| 5,867,691 A | 2/1999 | Shiraishi |
| 5,867,723 A | 2/1999 | Peters et al. |
| 5,870,620 A | 2/1999 | Kadosumi et al. |
| 5,884,075 A | 3/1999 | Hester et al. |
| 5,887,162 A | 3/1999 | Williams et al. |
| 5,887,165 A | 3/1999 | Martel et al. |
| 5,889,533 A | 3/1999 | Lee |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,894,565 A | 4/1999 | Furtek et al. |
| 5,898,602 A | 4/1999 | Rothman et al. |
| 5,901,279 A | 5/1999 | Davis, III |
| 5,915,099 A | 6/1999 | Takata et al. |
| 5,915,123 A | 6/1999 | Mirsky et al. |
| 5,924,119 A | 7/1999 | Sindhu et al. |
| 5,926,638 A | 7/1999 | Inoue |
| 5,927,423 A | 7/1999 | Wada et al. |
| 5,933,023 A | 8/1999 | Young |
| 5,933,642 A | 8/1999 | Baxter et al. |
| 5,936,424 A | 8/1999 | Young et al. |
| 5,943,242 A | 8/1999 | Vorbach et al. |
| 5,956,518 A | 9/1999 | DeHon et al. |
| 5,960,193 A | 9/1999 | Guttag et al. |
| 5,960,200 A | 9/1999 | Eager et al. |
| 5,966,143 A | 10/1999 | Breternitz, Jr. |
| 5,966,534 A | 10/1999 | Cooke et al. |
| 5,970,254 A | 10/1999 | Cooke et al. |
| 5,978,260 A | 11/1999 | Trimberger et al. |
| 5,978,583 A | 11/1999 | Ekanadham et al. |
| 5,996,048 A | 11/1999 | Cherabuddi et al. |
| 5,996,083 A | 11/1999 | Gupta et al. |
| 5,999,990 A | 12/1999 | Sharrit et al. |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,020,760 A | 2/2000 | Sample et al. |
| 6,021,490 A | 2/2000 | Vorbach et al. |
| 6,023,564 A | 2/2000 | Trimberger |
| 6,023,742 A | 2/2000 | Ebeling et al. |
| 6,026,481 A | 2/2000 | New et al. |
| 6,034,538 A | 3/2000 | Abramovici |
| 6,035,371 A | 3/2000 | Magloire |
| 6,038,650 A | 3/2000 | Vorbach et al. |
| 6,038,656 A | 3/2000 | Cummings et al. |
| 6,044,030 A | 3/2000 | Zheng et al. |
| 6,047,115 A | 4/2000 | Mohan et al. |
| 6,049,222 A | 4/2000 | Lawman |
| 6,049,866 A | 4/2000 | Earl |
| 6,052,773 A | 4/2000 | DeHon et al. |
| 6,054,873 A | 4/2000 | Laramie |
| 6,055,619 A | 4/2000 | North et al. |
| 6,058,469 A | 5/2000 | Baxter |
| 6,076,157 A | 6/2000 | Borkenhagen et al. |
| 6,077,315 A | 6/2000 | Greenbaum et al. |
| 6,078,736 A | 6/2000 | Guccione |
| 6,081,903 A | 6/2000 | Vorbach et al. |
| 6,084,429 A | 7/2000 | Trimberger |
| 6,085,317 A | 7/2000 | Smith |
| 6,086,628 A | 7/2000 | Dave et al. |

| | | | |
|---|---|---|---|
| 6,088,795 A | 7/2000 | Vorbach et al. | |
| 6,092,174 A | 7/2000 | Roussakov | |
| 6,096,091 A | 8/2000 | Hartmann | |
| 6,105,105 A | 8/2000 | Trimberger et al. | |
| 6,105,106 A | 8/2000 | Manning | |
| 6,108,760 A | 8/2000 | Mirsky et al. | |
| 6,118,724 A | 9/2000 | Higginbottom | |
| 6,119,181 A | 9/2000 | Vorbach et al. | |
| 6,122,719 A | 9/2000 | Mirsky et al. | |
| 6,125,408 A | 9/2000 | McGee et al. | |
| 6,127,908 A | 10/2000 | Bozler et al. | |
| 6,128,720 A | 10/2000 | Pechanek et al. | |
| 6,134,166 A | 10/2000 | Lytle et al. | |
| 6,137,307 A | 10/2000 | Iwanczuk et al. | |
| 6,145,072 A | 11/2000 | Shams et al. | |
| 6,150,837 A | 11/2000 | Beal et al. | |
| 6,150,839 A | 11/2000 | New et al. | |
| 6,154,048 A | 11/2000 | Iwanczuk et al. | |
| 6,154,049 A | 11/2000 | New | |
| 6,157,214 A | 12/2000 | Marshall | |
| 6,170,051 B1 | 1/2001 | Dowling | |
| 6,172,520 B1 | 1/2001 | Lawman et al. | |
| 6,173,419 B1 * | 1/2001 | Barnett | 714/28 |
| 6,173,434 B1 | 1/2001 | Wirthlin et al. | |
| 6,178,494 B1 | 1/2001 | Casselman | |
| 6,185,256 B1 | 2/2001 | Saito et al. | |
| 6,185,731 B1 | 2/2001 | Maeda et al. | |
| 6,188,240 B1 | 2/2001 | Nakaya | |
| 6,188,650 B1 | 2/2001 | Hamada et al. | |
| 6,198,304 B1 | 3/2001 | Sasaki | |
| 6,201,406 B1 | 3/2001 | Iwanczuk et al. | |
| 6,202,182 B1 | 3/2001 | Abramovici et al. | |
| 6,204,687 B1 | 3/2001 | Schultz et al. | |
| 6,211,697 B1 | 4/2001 | Lien et al. | |
| 6,212,544 B1 | 4/2001 | Borkenhagen et al. | |
| 6,212,650 B1 | 4/2001 | Guccione | |
| 6,215,326 B1 | 4/2001 | Jefferson et al. | |
| 6,216,223 B1 | 4/2001 | Revilla et al. | |
| 6,219,833 B1 | 4/2001 | Solomon et al. | |
| RE37,195 E | 5/2001 | Kean | |
| 6,230,307 B1 | 5/2001 | Davis et al. | |
| 6,240,502 B1 | 5/2001 | Panwar et al. | |
| 6,243,808 B1 | 6/2001 | Wang | |
| 6,247,147 B1 * | 6/2001 | Beenstra et al. | 714/39 |
| 6,252,792 B1 | 6/2001 | Marshall et al. | |
| 6,256,724 B1 | 7/2001 | Hocevar et al. | |
| 6,260,114 B1 | 7/2001 | Schug | |
| 6,260,179 B1 | 7/2001 | Ohsawa et al. | |
| 6,262,908 B1 | 7/2001 | Marshall et al. | |
| 6,263,430 B1 | 7/2001 | Trimberger et al. | |
| 6,266,760 B1 | 7/2001 | DeHon et al. | |
| 6,279,077 B1 | 8/2001 | Nasserbakht et al. | |
| 6,282,627 B1 | 8/2001 | Wong et al. | |
| 6,282,701 B1 | 8/2001 | Wygodny et al. | |
| 6,285,624 B1 | 9/2001 | Chen | |
| 6,286,134 B1 | 9/2001 | Click, Jr. et al. | |
| 6,288,566 B1 | 9/2001 | Hanrahan et al. | |
| 6,289,440 B1 | 9/2001 | Casselman | |
| 6,298,043 B1 | 10/2001 | Mauger et al. | |
| 6,298,396 B1 | 10/2001 | Loyer et al. | |
| 6,298,472 B1 | 10/2001 | Phillips et al. | |
| 6,301,706 B1 | 10/2001 | Maslennikov et al. | |
| 6,311,200 B1 | 10/2001 | Hanrahan et al. | |
| 6,311,265 B1 | 10/2001 | Beckerle et al. | |
| 6,321,298 B1 | 11/2001 | Hubis | |
| 6,321,366 B1 | 11/2001 | Tseng et al. | |
| 6,321,373 B1 | 11/2001 | Ekanadham et al. | |
| 6,338,106 B1 | 1/2002 | Vorbach et al. | |
| 6,339,840 B1 | 1/2002 | Kothari et al. | |
| 6,341,318 B1 | 1/2002 | Dakhil | |
| 6,347,346 B1 | 2/2002 | Taylor | |
| 6,349,346 B1 | 2/2002 | Hanrahan et al. | |
| 6,353,841 B1 | 3/2002 | Marshall et al. | |
| 6,362,650 B1 | 3/2002 | New et al. | |
| 6,370,596 B1 | 4/2002 | Dakhil | |
| 6,373,779 B1 | 4/2002 | Pang et al. | |
| 6,374,286 B1 | 4/2002 | Gee | |
| 6,378,068 B1 | 4/2002 | Foster et al. | |
| 6,381,624 B1 | 4/2002 | Colon-Bonet et al. | |
| 6,389,379 B1 | 5/2002 | Lin et al. | |
| 6,389,579 B1 | 5/2002 | Phillips et al. | |
| 6,392,912 B1 | 5/2002 | Hanrahan et al. | |
| 6,398,383 B1 | 6/2002 | Huang | |
| 6,400,601 B1 | 6/2002 | Sudo et al. | |
| 6,404,224 B1 | 6/2002 | Azegami et al. | |
| 6,405,185 B1 | 6/2002 | Pechanek et al. | |
| 6,405,299 B1 | 6/2002 | Vorbach et al. | |
| 6,421,808 B1 | 7/2002 | McGeer | |
| 6,421,809 B1 | 7/2002 | Wuytack et al. | |
| 6,421,817 B1 | 7/2002 | Mohan et al. | |
| 6,425,054 B1 | 7/2002 | Nguyen | |
| 6,425,068 B1 | 7/2002 | Vorbach | |
| 6,426,649 B1 | 7/2002 | Fu et al. | |
| 6,427,156 B1 | 7/2002 | Chapman et al. | |
| 6,430,309 B1 | 8/2002 | Pressman et al. | |
| 6,434,642 B1 | 8/2002 | Camilleri et al. | |
| 6,434,672 B1 | 8/2002 | Gaither | |
| 6,434,695 B1 | 8/2002 | Esfahani et al. | |
| 6,434,699 B1 | 8/2002 | Jones et al. | |
| 6,437,441 B1 | 8/2002 | Yamamoto | |
| 6,438,747 B1 | 8/2002 | Schreiber et al. | |
| 6,449,283 B1 | 9/2002 | Chao et al. | |
| 6,457,116 B1 | 9/2002 | Mirsky et al. | |
| 6,476,634 B1 | 11/2002 | Bilski | |
| 6,477,643 B1 | 11/2002 | Vorbach et al. | |
| 6,480,937 B1 | 11/2002 | Vorbach et al. | |
| 6,480,954 B2 | 11/2002 | Trimberger et al. | |
| 6,483,343 B1 | 11/2002 | Faith et al. | |
| 6,487,709 B1 | 11/2002 | Keller et al. | |
| 6,490,695 B1 | 12/2002 | Zagorski et al. | |
| 6,496,902 B1 | 12/2002 | Faanes et al. | |
| 6,496,971 B1 | 12/2002 | Lesea et al. | |
| 6,507,898 B1 | 1/2003 | Gibson et al. | |
| 6,507,947 B1 | 1/2003 | Schreiber et al. | |
| 6,512,804 B1 | 1/2003 | Johnson et al. | |
| 6,513,077 B2 | 1/2003 | Vorbach et al. | |
| 6,516,382 B2 | 2/2003 | Manning | |
| 6,518,787 B1 | 2/2003 | Allegrucci et al. | |
| 6,519,674 B1 | 2/2003 | Lam et al. | |
| 6,523,107 B1 | 2/2003 | Stansfield et al. | |
| 6,525,678 B1 | 2/2003 | Veenstra et al. | |
| 6,526,520 B1 | 2/2003 | Vorbach et al. | |
| 6,538,468 B1 | 3/2003 | Moore | |
| 6,538,470 B1 | 3/2003 | Langhammer et al. | |
| 6,539,415 B1 | 3/2003 | Mercs | |
| 6,539,438 B1 | 3/2003 | Ledzius et al. | |
| 6,539,477 B1 | 3/2003 | Seawright | |
| 6,542,394 B2 | 4/2003 | Marshall et al. | |
| 6,542,844 B1 * | 4/2003 | Hanna | 702/120 |
| 6,542,998 B1 | 4/2003 | Vorbach | |
| 6,553,395 B2 | 4/2003 | Marshall et al. | |
| 6,553,479 B2 | 4/2003 | Mirsky et al. | |
| 6,567,834 B1 | 5/2003 | Marshall et al. | |
| 6,571,381 B1 | 5/2003 | Vorbach et al. | |
| 6,587,939 B1 | 7/2003 | Takano | |
| 6,598,128 B1 | 7/2003 | Yoshioka et al. | |
| 6,606,704 B1 | 8/2003 | Adiletta et al. | |
| 6,624,819 B1 | 9/2003 | Lewis | |
| 6,631,487 B1 * | 10/2003 | Abramovici et al. | 714/725 |
| 6,633,181 B1 | 10/2003 | Rupp | |
| 6,657,457 B1 | 12/2003 | Hanrahan et al. | |
| 6,658,564 B1 | 12/2003 | Smith et al. | |
| 6,665,758 B1 | 12/2003 | Frazier et al. | |
| 6,668,237 B1 * | 12/2003 | Guccione et al. | 702/119 |
| 6,681,388 B1 | 1/2004 | Sato et al. | |
| 6,687,788 B1 | 2/2004 | Vorbach et al. | |
| 6,697,979 B1 | 2/2004 | Vorbach et al. | |
| 6,704,816 B1 | 3/2004 | Burke | |
| 6,708,325 B2 | 3/2004 | Cooke et al. | |
| 6,504,398 B1 | 4/2004 | Vorbach | |
| 6,717,436 B2 | 4/2004 | Kress et al. | |
| 6,721,830 B2 | 4/2004 | Vorbach et al. | |
| 6,725,334 B2 | 4/2004 | Barroso et al. | |
| 6,728,871 B1 | 4/2004 | Vorbach et al. | |
| 6,745,317 B1 | 6/2004 | Mirsky et al. | |
| 6,748,440 B1 | 6/2004 | Lisitsa et al. | |
| 6,751,722 B2 | 6/2004 | Mirsky et al. | |
| 6,754,805 B1 | 6/2004 | Juan | |

| | | | |
|---|---|---|---|
| 6,757,847 B1 | 6/2004 | Farkash et al. | |
| 6,757,892 B1 | 6/2004 | Gokhale et al. | |
| 6,782,445 B1 | 8/2004 | Olgiati et al. | |
| 6,785,826 B1 | 8/2004 | Durham et al. | |
| 6,802,026 B1 | 10/2004 | Patterson et al. | |
| 6,803,787 B1 | 10/2004 | Wicker, Jr. | |
| 6,820,188 B2 | 11/2004 | Stansfield et al. | |
| 6,829,697 B1 | 12/2004 | Davis et al. | |
| 6,836,842 B1* | 12/2004 | Guccione et al. | 713/100 |
| 6,847,370 B2 | 1/2005 | Baldwin et al. | |
| 6,868,476 B2 | 3/2005 | Rosenbluth et al. | |
| 6,871,341 B1 | 3/2005 | Shyr | |
| 6,874,108 B1 | 3/2005 | Abramovici et al. | |
| 6,886,092 B1 | 4/2005 | Douglass et al. | |
| 6,901,502 B2 | 5/2005 | Yano et al. | |
| 6,928,523 B2 | 8/2005 | Yamada | |
| 6,961,924 B2 | 11/2005 | Bates et al. | |
| 6,975,138 B2 | 12/2005 | Pani et al. | |
| 6,977,649 B1 | 12/2005 | Baldwin et al. | |
| 7,000,161 B1 | 2/2006 | Allen et al. | |
| 7,007,096 B1 | 2/2006 | Lisitsa et al. | |
| 7,010,667 B2 | 3/2006 | Vorbach et al. | |
| 7,028,107 B2 | 4/2006 | Vorbach et al. | |
| 7,036,114 B2 | 4/2006 | McWilliams et al. | |
| 7,038,952 B1 | 5/2006 | Zack et al. | |
| 7,043,416 B1 | 5/2006 | Lin | |
| 7,210,129 B2 | 4/2007 | May et al. | |
| 7,216,204 B2 | 5/2007 | Rosenbluth et al. | |
| 7,237,087 B2 | 6/2007 | Vorbach et al. | |
| 7,249,351 B1 | 7/2007 | Songer et al. | |
| 7,254,649 B2 | 8/2007 | Subramanian et al. | |
| 7,340,596 B1 | 3/2008 | Crosland et al. | |
| 7,346,644 B1 | 3/2008 | Langhammer et al. | |
| 7,350,178 B1 | 3/2008 | Crosland et al. | |
| 7,382,156 B2 | 6/2008 | Pani et al. | |
| 7,595,659 B2 | 9/2009 | Vorbach et al. | |
| 7,650,448 B2 | 1/2010 | Vorbach et al. | |
| 7,657,877 B2 | 2/2010 | Vorbach et al. | |
| 7,759,968 B1 | 7/2010 | Hussein et al. | |
| 2001/0001860 A1 | 5/2001 | Beiu | |
| 2001/0003834 A1 | 6/2001 | Shimonishi | |
| 2001/0010074 A1 | 7/2001 | Nishihara et al. | |
| 2001/0018733 A1 | 8/2001 | Fujii et al. | |
| 2001/0032305 A1 | 10/2001 | Barry | |
| 2002/0010853 A1 | 1/2002 | Trimberger et al. | |
| 2002/0013861 A1 | 1/2002 | Adiletta et al. | |
| 2002/0038414 A1 | 3/2002 | Taylor | |
| 2002/0045952 A1 | 4/2002 | Blemel | |
| 2002/0073282 A1 | 6/2002 | Chauvel et al. | |
| 2002/0083308 A1 | 6/2002 | Pereira et al. | |
| 2002/0099759 A1 | 7/2002 | Gootherts | |
| 2002/0103839 A1 | 8/2002 | Ozawa | |
| 2002/0124238 A1 | 9/2002 | Metzgen | |
| 2002/0138716 A1 | 9/2002 | Paul et al. | |
| 2002/0143505 A1 | 10/2002 | Drusinsky | |
| 2002/0144229 A1 | 10/2002 | Hanrahan | |
| 2002/0152060 A1 | 10/2002 | Tseng | |
| 2002/0156962 A1 | 10/2002 | Chopra et al. | |
| 2002/0165886 A1 | 11/2002 | Lam | |
| 2003/0001615 A1 | 1/2003 | Sueyoshi et al. | |
| 2003/0014743 A1 | 1/2003 | Cooke et al. | |
| 2003/0046607 A1 | 3/2003 | Vorbach | |
| 2003/0052711 A1 | 3/2003 | Taylor | |
| 2003/0055861 A1 | 3/2003 | Lai et al. | |
| 2003/0056062 A1 | 3/2003 | Prabhu | |
| 2003/0056085 A1 | 3/2003 | Vorbach | |
| 2003/0056091 A1 | 3/2003 | Greenberg | |
| 2003/0056202 A1 | 3/2003 | Vorbach | |
| 2003/0061542 A1 | 3/2003 | Bates et al. | |
| 2003/0062922 A1 | 4/2003 | Douglass et al. | |
| 2003/0070059 A1 | 4/2003 | Dally et al. | |
| 2003/0086300 A1 | 5/2003 | Noyes et al. | |
| 2003/0093662 A1 | 5/2003 | Vorbach et al. | |
| 2003/0097513 A1 | 5/2003 | Vorbach et al. | |
| 2003/0123579 A1 | 7/2003 | Safavi et al. | |
| 2003/0135686 A1 | 7/2003 | Vorbach et al. | |
| 2003/0154349 A1 | 8/2003 | Berg et al. | |
| 2003/0192032 A1* | 10/2003 | Andrade et al. | 717/124 |
| 2004/0015899 A1 | 1/2004 | May et al. | |
| 2004/0025005 A1 | 2/2004 | Vorbach et al. | |
| 2004/0039880 A1 | 2/2004 | Pentkovski et al. | |
| 2004/0078548 A1 | 4/2004 | Claydon et al. | |
| 2004/0168099 A1 | 8/2004 | Vorbach et al. | |
| 2004/0199688 A1 | 10/2004 | Vorbach et al. | |
| 2005/0066213 A1 | 3/2005 | Vorbach et al. | |
| 2005/0091468 A1 | 4/2005 | Morita et al. | |
| 2005/0144210 A1 | 6/2005 | Simkins et al. | |
| 2005/0144212 A1 | 6/2005 | Simkins et al. | |
| 2005/0144215 A1 | 6/2005 | Simkins et al. | |
| 2006/0036988 A1 | 2/2006 | Allen et al. | |
| 2006/0230094 A1 | 10/2006 | Simkins et al. | |
| 2006/0230096 A1 | 10/2006 | Thendean et al. | |
| 2007/0083730 A1 | 4/2007 | Vorbach et al. | |
| 2008/0313383 A1 | 12/2008 | Morita et al. | |
| 2009/0085603 A1 | 4/2009 | Paul et al. | |
| 2010/0306602 A1 | 12/2010 | Kamiya et al. | |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 726 532 | 8/1996 |
| EP | 0 735 685 | 10/1996 |
| EP | 735 685 | 10/1996 |
| EP | 0 746 106 | 12/1996 |
| EP | 0 748 051 | 12/1996 |
| EP | 746 106 | 12/1996 |
| EP | 748 051 | 12/1996 |
| EP | 0 926 594 | 6/1999 |
| EP | 926 594 | 6/1999 |
| EP | 1 061 439 | 12/2000 |
| EP | 1 102 674 | 5/2001 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 10-44571 | 2/1989 |
| JP | 01-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 6-266605 | 9/1994 |
| JP | 07-086921 | 3/1995 |
| JP | 7-154242 | 6/1995 |
| JP | 8-148989 | 6/1995 |
| JP | 8-44581 | 2/1996 |

| | | |
|---|---|---|
| JP | 08069447 | 3/1996 |
| JP | 08-101761 | 4/1996 |
| JP | 8-102492 | 4/1996 |
| JP | 8-221164 | 8/1996 |
| JP | 8-250685 | 9/1996 |
| JP | 9-27745 | 1/1997 |
| JP | 09-294069 | 11/1997 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 03/091875 | 11/2003 |
| WO | WO2004/053718 | 6/2004 |
| WO | WO2004/114128 | 12/2004 |
| WO | WO2005/045692 | 3/2005 |
| WO | WO 2007/030395 | 3/2007 |

OTHER PUBLICATIONS

Price et al., "Debug of Reconfigurable Systems", 2000, Proceedings of SPIE.*
Ballagh et al., "Java Debug Hardware Models using JBits", 2001.*
Bellows et al., "Designing Run-Time Reconfigurable Systems with JHDL", 2001, Journal of VLSI Signal Processing.*
Sundararajan et al., "Testing FPGA Devices Using JBits", 2001.*
Abnous et al., "Ultra-Low-Power Domain-Specific Multimedia Processors," U.C. Berkeley, 1996 IEEE, pp. 461-470.
Abnous, A., et al., "The Pleiades Architecture," Chapter 1 of *The Application of Programmable DSPs in Mobile Communications*, A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Albaharna, O.T. et al., "On the Viability of FPGA-Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Arabi, et al., "PLD Integrates Dedicated High-speed Data Buffering, Complex State machine, and Fast Decode Array," conference record on WESCON '93, Sep. 28, 1993, pp. 432-436.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Athanas, "A Functional Reconfigurable Architecture and Compiler for Adoptive Computing," IEEE 1993, pp. 49-55.
Athanas, et al., "An Adaptive Hardware Machine Architecture and Compiler for Dynamic Processor Reconfigufation," IEEE, Laboratory for Engineering man/Machine Systems Division of Engineering, Box D, Brown University, Providence, Rhode Island, 1991, pp. 397-400.
Athanas et al., "Processor Reconfiguration Through Instruction-Set Metamorphosis," 1993, IEEE Computers, pp. 11-18.
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Bacon, D. et al., "Compiler Transformations for High-Performance Computing," ACM Computing Surveys, 26(4):325-420 (1994).
Baumgarte, V. et al., PACT XPP "A Self-reconfigurable Data Processing Architecture," PACT Info. GMBH, Munchen Germany, 2001, 7 pages.
Beck et al., "From control flow to data flow," TR 89-1050, Oct. 1989, Dept. of Computer Science, Cornell University, Ithaca, NY, pp. 1-25.
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).
Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.
Bittner, "Wormhole Run-time Reconfiguration: Conceptualization and VLSI Design of a High Performance Computing System," *Dissertation*, Jan. 23, 1997, pp. I-XX, 1-415.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cadambi, et al., "Managing Pipeline-reconfigurable FPGAs," ACM, 1998, pp. 55-64.
Callahan, et al., "The Garp Architecture and C Compiler," Computer, Apr. 2000, pp. 62-69.
Cardoso, J.M.P. et al., "A novel algorithm combining temporal partitioning and sharing of functional units," University of Algarve, Faro, Portugal, 2001 IEEE, pp. 1-10.
Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and *English Abstract only*).

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

Compton, K. et al., "Configurable Computing: A Survey of Systems and Software," Northwestern University, Dept. of ECE, Technical Report, 1999, (XP-002315148), 39 pages.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Cronquist, D. et al., Architecture Design of Reconfigurable Pipelined Datapaths, Department of Computer Science and Engineering, University of Washington, Seattle, WA, Proceedings of the 20$^{th}$ Anniversary Conference on Advanced Research in VSLI, 1999, pp. 1-15.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Diniz, P., et al., "Automatic Synthesis of Data Storage and Control Structures for FPGA-based Computing Engines," 2000, IEEE, pp. 91-100.

Diniz, P., et al., "A behavioral synthesis estimation interface for configurable computing," University of Southern California, Marina Del Rey, CA, 2001 IEEE, pp. 1-2.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compilers?," IEEE, 1997, pp. 322-325.

Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator.com, 2001, 4 pages.

Ferrante, J. et al., "The Program Dependence Graph and its Use in Optimization ACM Transactions on Programming Languages and Systems," Jul. 1987, USA, [online] Bd. 9, Nr. 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the 2$^{nd}$ Annual IEEE International Conference on Innovative Systems in Silicon, New York, NY, Oct. 1997, pp. 323-330.

Forstner, "Wer Zuerst Kommt, Mahlt Zuerst!: Teil 3: Einsatzgebiete und Anwendungbeispiele von FIFO-Speichern," Elektronik, Aug. 2000, pp. 104-109.

Franklin, Manoj et al., "A Fill-Unit Approach to Multiple Instruction Issue," Proceedings of the Annual International Symposium on Microarchitecture, Nov. 1994, pp. 162-171.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Gokhale, M.B. et al., "Automatic Allocation of Arrays to Memories in FPGA processors with Multiple Memory Banks," Field-Programmable Custom Computing Machines, 1999, IEEE, 6 pages.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R. et al., "A new FPGA architecture for word-oriented datapaths," Proc. FPL'94, Springer LNCS, Sep. 1994, pp. 144-155.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hwang, K., "Advanced Computer Architecture—Parallelism, Scalability, Programmability," 1993, McGraw-Hill, Inc., pp. 348-355.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Hwang, K., "Computer Architecture and Parallel Processing," Data Flow Computers and VLSI Computations, XP-002418655, 1985 McGraw-Hill, Chapter 10, pp. 732-807.

IBM Technical Disclosure Bulletin, IBM Corp., New York, XP000424878, Bd. 36, Nr. 1, Nov. 1, 1993, pp. 335-336.

Inside DSP, "Ambric Discloses Massively Parallel Architecture," Aug. 23, 2006, HTTP://insidedsp.com/tabid/64/articleType/ArticleView/articleId/155/Defa..., 2 pages.

Intel, Intel MXP5800/MXP5400 Digital Media Processors, Architecture Overview, Jun. 2004, Revision 2.4, pp. 1-24.

Iseli, C.,et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6$^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, A., et al., "Practical Experiences with the SPARXIL Co-Processor," 1998, IEEE, pp. 394-398.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the 15th Annual International Symposium on Computer Architecture, May 30, 1998, pp. 252-260.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield, C., "Logic that Mutates While-U-Wait," EDN (Bur. Ed) (USA), EDN (European Edition), Nov. 7, 1996, Cahners Publishing, USA, pp. 137-140, 142.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Myers, G. "Advances in Computer Architecture," Wiley-Interscience Publication, 2nd ed., John Wiley & Sons, Inc., 1978, pp. 463-494.

Nageldinger, U., "Design-Space Exploration for Coarse Grained Reconfigurable Architectures," (Dissertation) Universitaet Kaiserslautern, 2000, Chapter 2, pp. 19-45.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Olukotun, K., "The Case for a Single-Chip Microprocessor," ACM Sigplan Notices, ACM, Association for Computing Machinery, New York, vol. 31, No. 9, Sep. 1996 pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

PACT Corporation, "The XPP Communication System," Technical Report 15 (2000), pp. 1-16.

Piotrowski, A., "IEC-BUS, Die Funktionsweise des IEC-Bus unde seine Anwendung in Geräten und Systemen," 1987, Franzis-Verlag GmbH, München, pp. 20-25.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Parhami, B., "Parallel Counters for Signed Binary Signals," Signals, Systems and Computers, 1989, Twenty-Third Asilomar Conference, vol. 1, pp. 513-516.

Razdan et al., A High-Performance Microarchitecture with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.

Saleeba, Z.M.G., "A Self-Reconfiguring Computer System," Department of Computer Science, Monash University (Dissertation) 1998, pp. 1-306.

Saleeba, M. "A Self-Contained Dynamically Reconfigurable Processor Architecture," Sixteenth Australian Computer Science Conference, ASCS-16, QLD, Australia, Feb. 1993, pp. 59-70.

Schmidt, H. et al., "Behavioral synthesis for FGPA-based computing," Carnegie Mellon University, Pittsburgh, PA, 1994 IEEE, pp. 125-132.

Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, C.,"Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The >S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13th International Symposium on System Synthesis, Sep. 2000, pp. 193-198.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Skokan, Z.E., "Programmable logic machine (A programmable cell array)," IEEE Journal of Solid-State Circuits, vol. 18, Issue 5, Oct. 1983, pp. 572-578.

Soni, M., "VLSI Implementation of a Wormhole Run-time Reconfigurable Processor," Jun. 2001, (Masters Thesis)Virginia Polytechnic Institute and State University, 88 pages.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Sutton et al., "A Multiprocessor DSP System Using PADDI-2," U.C. Berkeley, 1998 ACM, pp. 62-65.

Tau, E., et al., "A First Generation DPGA Implementation," *FPD '95*, pp. 138-143.

Tenca, A.F., et al., "A Variable Long-Precision Arithmetic Unit Design for Reconfigurable Coprocessor Architectures," University of California, Los Angeles, 1998, pp. 216-225.

TMS320C54X DSP: CPU and Peripherals, Texas Instruments, 1996, 25 pages.

TMS320C54x DSP: Mnemonic Instruction Set, Texas Instruments, 1996, 342 pages.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Villasenor, et al., "Configurable Computing Solutions for Automatic Target Recognition," IEEE, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Waingold, E., et al., "Baring it all to software: Raw machines," IEEE Computer, Sep. 1997, at 86-93.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, Markus et al., "Memory Access Optimization for Reconfigurable Systems," IEEE Proceedings Computers and Digital Techniques, 48(3) (May 2001) pp. 1-16.

Wittig, et al., "OneChip: An FPGA Processor with Reconfigurable Logic," IEEE, 1996, pp. 126-135.

Wolfe, M. et al., "High Performance Compilers for Parallel Computing" (Addison-Wesley 1996) Table of Contents, 11 pages.

Wu, et al., "A New Cache Directory Scheme," IEEE, pp. 466-472, Jun. 1996.

Xu, H. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.

Xilinx, "Logic Cell Array Families: XC4000, XC4000A and XC4000H," 1994, product description, pp. 2-7, 2-9, 2-14, 2-15, 8-16, and 9-14.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.

*Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

*Zhang et al., "Abstract: Low-Power Heterogeneous Reconfigurable Digital Signal Processors with Energy-Efficient Interconnect Network," U.C. Berkeley (2004), pp. 1-120.

*Zima, H. et al., "Supercompilers for parallel and vector computers" (Addison-Wesley 1991) Table of Contents, 5 pages.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38th conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," XILINX, Inc., Section 2, pp. 1-240, Section 8, pp. 1, 23-25, 29, 45-52, 169-172 (1994).

Becker et al., "Automatic Parallelism Exploitation for FPL-Based Accelerators," 1998, Proc. 31st Annual Hawaii International Conference on System Sciences, pp. 169-178.

Cardoso, J.M.P. et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on Napa Valley, CA, USA, Apr. 21-23, 1999, IEEE Comput. Soc, US, (Apr. 21, 1999) pp. 2-11.

U.S. Appl. No. 60/109,417, filed Nov. 18, 1998, Jefferson et al.

Cook, Jeffrey J., "The Amalgam Compiler Infrastructure," Thesis at the University of Illinois at Urbana-Champaign (2004) Chapter 7 & Appendix G.

Fawcett, B.K., "Map, Place and Route: The Key to High-Density PLD Implementation," Wescon Conference, IEEE Center (Nov. 7, 1995) pp. 292-297.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Koch, Andreas et al., "High-Level-Language Compilation for Reconfigurable Computers," Proceedings of European Workshop on Reconfigurable Communication-Centric SOCS (Jun. 2005) 8 pages.

Moraes, F., et al., "A Physical Synthesis Design Flow Based on Virtual Components," XV Conference on Design of Circuits and Integrated Systems (Nov. 2000) 6 pages.

Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Sondervan, J., "Retiming and logic synthesis," Electronic Engineering (Jan. 1993) vol. 65(793), pp. 33,35-36.

Ohmsha, "Information Processing Handbook," edited by the Information Processing Society of Japan, pp. 376, Dec. 21, 1998.

U.S. Appl. No. 60/119,417, filed Nov. 18, 1998, Jefferson et al.

Altera, "APEX 20K Programmable Logic Device Family," Altera Corporation Data Sheet, Mar. 2004, ver. 5.1, pp. 1-117.

Chaudhry, G.M. et al., "Separated caches and buses for multiprocessor system," Circuits and Systems, 1993; Proceedings of the 36$^{th}$ Midwest Symposium on Detroit, MI, USA, Aug. 16-18, 1993, New York, NY IEEE, Aug. 16, 1993, pp. 1113-1116, XP010119918 ISBN: 0-7803-1760-2.

Culler, D.E; Singh, J.P., "Parallel Computer Architecture," pp. 434-437, 1999, Morgan Kaufmann, San Francisco, CA USA, XP002477559.

Lange, H. et al., "Memory access schemes for configurable processors," Field-Programmable Logic and Applications, International Workshop, FPL, Aug. 27, 2000, pp. 615-625, XP02283963.

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2×4 User Manual, "CHA2×4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors*, 1995, Fremont, CA., pp. 673-698.

Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.

Cartier, Lois, *Xilinx Application Note*, "System Design with New XC4000EX I/O Features," Feb. 21, 1996, pp. 1-8.

Chen, D., (Thesis) "Programmable arithmetic devices for high speed digital signal processing," U. California Berkeley 1992, pp. 1-175.

Churcher, S., et al., "The XC6200 FastMap TM Processor Interface," Xilinx, Inc., Aug. 1995, pp. 1-8.

Cowie, Beth, *Xilinx Application Note*, "High Performance, Low Area, Interpolator Design for the XC6200," XAPP 081, May 7, 1997 (Version 1.0), pp. 1-10.

Duncan, Ann, *Xilinx Application Note*, "A32×16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.

Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.

Fawcett, B., "New SRAM-Based FPGA Architectures Address New Applications," Xilinx, Inc. San Jose, CA, Nov. 1995, pp. 231-236.

Goslin, G; Newgard, B, *Xilinx Application Note*, "16-Tap, 8-Bit FIR Filter Applications Guide," Nov. 21, 1994, pp. 1-5.

Iwanczuk, Roman, *Xilinx Application Note*, "Using the XC4000 RAM Capability," XAPP 031.000, 1994, pp. 8-127 through 8-138.

Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.

New, Bernie, *Xilinx Application Note*, "Boundary Scan Emulator for XC3000," XAPP 007.001, 1994, pp. 8-53 through 8-59.

New, Bernie, *Xilinx Application Note*, "Ultra-Fast Synchronous Counters," XAPP 014.001, 1994, pp. 8-78 through 8-81.

New, Bernie, *Xilinx Application Note*, "Using the Dedicated Carry Logic in XC4000," XAPP 013.001, 1994, pp. 8-105 through 8-115.

New, Bernie, *Xilinx Application Note*, "Complex Digital Waveform Generator," XAPP 008.002, 1994, pp. 8-163 through 8-164.

New, Bernie, *Xilinx Application Note*, "Bus-Structured Serial Input-Output Device," XAPP 010.001, 1994, pp. 8-181 through 8-182.

Ridgeway, David, *Xilinx Application Note*, "Designing Complex 2-Dimensional Convolution Filters," XAPP 037.000, 1994, pp. 8-175 through 8-177.

Rowson, J., et al., "Second-generation compilers optimize semicustom circuits," Electronic Design, Feb. 19, 1987, pp. 92-96.

Schewel, J., "A Hardware/Software Co-Design System using Configurable Computing Technology," Virtual Computer Corporation, Reseda, CA, IEEE 1998, pp. 620-625.

Segers, Dennis, Xilinx Memorandum, "MIKE—Product Description and MRD," Jun. 8, 1994, pp. 1-29.

Texas Instruments, "TMS320C8x System-Level Synopsis," Sep. 1995, 75 pages.

Texas Instruments, "TMS320C80 Digital Signal Processor," Data Sheet, Digital Signal Processing Solutions 1997, 171 pages.

Texas Instruments, "TMS320C80 (MVP) Parallel Processor," User's Guide, Digital Signal Processing Products 1995, 73 pages.

Trainor, D.W., et al., "Implementation of the 2D DCT Using a Xilinx XC6264 FPGA," 1997, IEEE Workshop of Signal Processing Systems SiPS 97, pp. 541-550.

Trimberger, S, (Ed.) et al., "Field-Programmable Gate Array Technology," 1994, Kluwer Academic Press, pp. 1-258 (and the Title Page, Table of Contents, and Preface) [274 pages total].

Trimberger, S., "A Reprogrammable Gate Array and Applications," IEEE 1993, Proceedings of the IEEE, vol. 81, No. 7, Jul. 1993, pp. 1030-1041.

Trimberger, S., et al., "A Time-Multiplexed FPGA," Xilinx, Inc., 1997 IEEE, pp. 22-28.

Ujvari, Dan, *Xilinx Application Note*, "Digital Mixer in an XC7272," XAPP 035.002, 1994, p. 1.

Veendrick, H., et al., "A 1.5 GIPS video signal processor (VSP)," Philips Research Laboratories, The Netherlands, IEEE 1994 Custom Integrated Circuits Conference, pp. 95-98.

Wilkie, Bill, *Xilinx Application Note*, "Interfacing XC6200 to Microprocessors (TMS320C50 Example)," XAPP 064, Oct. 9, 1996 (Version 1.1), pp. 1-9.

Wilkie, Bill, *Xilinx Application Note*, "Interfacing XC6200 to Microprocessors (MC68020 Example)," XAPP 063, Oct. 9, 1996 (Version 1.1), pp. 1-8.

XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.

*Xilinx Application Note*, Advanced Product Specification, "XC6200 Field Programmable Gate Arrays," Jun. 1, 1996 (Version 1.0), pp. 4-253-4-286.

*Xilinx Application Note*, A Fast Constant Coefficient Multiplier for the XC6200, XAPP 082, Aug. 24, 1997 (Version 1.0), pp. 1-5.

Xilinx Technical Data, "XC5200 Logic Cell Array Family," Preliminary (v1.0), Apr. 1995, pp. 1-43.

Xilinx Data Book, "The Programmable Logic Data Book," 1996, 909 pages.

Xilinx, Series 6000 User's Guide, Jun. 26, 1997, 223 pages.

Yeung, K., (Thesis) "A Data-Driven Multiprocessor Architecture for High Throughput Digital Signal Processing," Electronics Research Laboratory, U. California Berkeley, Jul. 10, 1995, pp. 1-153.

Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.

ZILOG Preliminary Product Specification, "Z86C95 CMOS Z8 Digital Signal Processor," 1992, pp. 1-82.

ZILOG Preliminary Product Specification, "Z89120 Z89920 (ROMless) 16-Bit Mixed Signal Processor," 1992, pp. 1-82.

Defendants' Invalidity Contentions in *PACT XPP Technologies, AG v. XILINX, Inc.*, et al., (*E.D. Texas Dec. 28, 2007*) (No. 2:07cv563)., including Exhibits A through K in separate PDF files.

Kanter, David, "NVIDIA's GT200: Inside a Parallel Processor," http://www.realworldtech.com/page.cfm?ArticleID=RWT090989195242&p=1, Sep. 8, 2008, 27 pages.

XILINX, "Virtex-E 1.8 V Extended Memory Field Programmable Gate Arrays," (v2.2) Sep. 10, 2002, Xilinx Production Product Specification, pp. 1-52.

XILINX, "Virtex-II and Virtex-II Pro X FPGA Platform FPGAs: Complete Data Sheet," (v4.6) Mar. 5, 2007, pp. 1-302.

XILINX, "Virtex-II Platform FPGAs: Complete Data Sheet," (v3.5) Nov. 5, 2007, pp. 1-226.

IMEC, "ADRES multimedia processor & 3MF multimedia platform," Transferable IP, IMEC Technology Description, (Applicants believe the date to be Oct. 2005), 3 pages.

Huang, Libo et al., "A New Architecture for Multiple-Precision Floating-Point Multiply-Add Fused Unit Design," School of Computer National University of Defense Technology, China, IEEE 2007, 8 pages.

Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.

XILINX, White Paper 370: (Virtex-6 and Spartan-6 FPGA Families) "Reducing Switching Power with Intelligent Clock Gating," Frederic Rivoallon, May 3, 2010, pp. 1-5.

XILINX, White Paper 298: (Spartan-6 and Virtex-6 Devices) "Power Consumption at 40 and 50 nm," Matt Klein, Apr. 13, 2009, pp. 1-21.

Becker, J., "A Partitioning Compiler for Computers with Xputer-based Accelerators," 1997, Kaiserslautern University, 326 pp.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Altera, "2. TriMatrix Embedded Memory Blocks in Stratix & Stratix GX Devices," Altera Corporation, Jul. 2005, 28 pages.

Altera, "APEX II Programmable Logic Device Family," Altera Corporation Data Sheet, Aug. 2002, Ver. 3.0, 99 pages.

"BlueGene/L—Hardware Architecture Overview," BlueGene/L design team, IBM Research, Oct. 17, 2003 slide presentation, pp. 1-23.

"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.

BlueGene/L, "An Overview of the BlueGene/L Supercomputer," The BlueGene/L Team, IBM and Lawrence Livermore National Laboratory, 2002 IEEE. pp. 1-22.

Galanis, M.D. et al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.

Guo, Z. et al., "A Compiler Intermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9, No. 7 (MicroDesign Resources), May 30, 1995, p. 1 and pp. 6-10.

Intel, "Pentium Pro Family Developer's Manual, vol. 3: Operating System Writer's Guide," Intel Corporation, Dec. 1995, [submitted in 4 PDF files: Part I, Part II, Part III and Part IV], 458 pages.

Culler, D.E; Singh, J.P., "Parallel Computer Architecture," p. 17, 1999, Morgan Kaufmann, San Francisco, CA USA, XP002477559.

Short, Kenneth L., *Microprocessors and Programmed Logic*, Prentice Hall, Inc., New Jersey 1981, p. 34.

Webster's Ninth New Collegiate Dictionary, Merriam-Webster, Inc., 1990, p. 332 (definition of "dedicated").

ARM Limited, "ARM Architecture Reference Manual," Dec. 6, 2000, pp. A10-6-A10-7.

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

U.S. Reexamination Application Control No. 90/011,087, Vorbach et al., filed Jul. 8, 2010, supplied documents only.

FOLDOC, The Free On-Line Dictionary of Computing, "handshaking," online Jan. 13, 1995, retrieved from Internet Jan. 23, 2011 at http://foldoc.org/handshake.

Melvin, Stephen et al., "Hardware Support for Large Atomic Units in Dynamically Scheduled Machines," Computer Science Division, University of Califormia, Berkeley, IEEE (1988), pp. 60-63.

Roterberg, Eric., et al., "Trace Cache: a Low Latency Approach to High Bandwidth Instruction Fetching," Proceedings of the 29th Annual Internatinoal Symposium on Michoarchitecture, Paris, France, IEEE (1996), 12 pages.

Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.

Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.

Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.

Li et al., "Hardware-Software Co-Design of Embedded Reconfigurable Architectures," Los Angeles, CA, 2000 ACM, pp. 507-512.

Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.

Pistorius et al., "Generation of Very Large Circuits to Benchmark the Partitioning of FPGAs," Monterey, CA, ACM 1999, pp. 67-73.

Translation of DE 101 39 170, filed Aug. 16, 2001, by examiner in related case using Google Translate, 10 pages.

Altera, "Implementing High-Speed Search Applications with Altera CAM," Jul. 2001, Ver. 2.1, Application Note 119, 50 pages.

Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.

Abnous et al., "Ultra-Low-Power Domain-Specific Multimedia Processors," U.C. Berkeley, 1996 IEEE, pp. 461-470.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Ade, et al., "Minimum Memory Buffers in DSP Applications," Electronics Letters, vol. 30, No. 6, Mar. 17, 1994, pp. 469-471.

Albaharna, O.T. et al., "On the Viability of FPGA-Based Integrated Coprocessors," Dept. of Electrical and Electronic Engineering, Imperial College of Science, London, 1999 IEEE, pp. 206-215.

Alippi, et al., "Determining the Optimum Extended Instruction Set Architecture for Application Specific Reconfigurable VLIW CPUs," IEEE, 2001, pp. 50-56.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Arabi, et al., "PLD Integrates Dedicated High-speed Data Buffering, Complex State machine, and Fast Decode Array," conference record on WESCON '93, Sep. 28, 1993, pp. 432-436.

Atmel, 5-K-50K Gates Coprocessor FPGA with Free Ram, Data Sheet, Jul. 2006, 55 pages.

Atmel, "An Introduction to DSP Applications using the AT4OK FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Athanas, "A Functional Reconfigurable Architecture and Compiler for Adoptive Computing," IEEE 1993, pp. 49-55.

Athanas, et al., "An Adaptive Hardware Machine Architecture and Compiler for Dynamic Processor Reconfigugation," IEEE, Laboratory for Engineering man/Machine Systems Division of Engineering, Box D, Brown University, Providence, Rhode Island, 1991, pp. 397-400.

Athanas et al., "Processor Reconfiguration Through Instruction-Set Metamorphosis," 1993, IEEE Computers, pp. 11-18.

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Tau, E., et al., "A First Generation DPGA Implementation," *FPD*'95, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, PACT—A Technical Perspective, Mar. 27, 2002, pp. 1-27.

TMS320C54x DSP: Mnemonic Instruction Set, Texas Instruments, 1996, 342 pages.

Tsutsui, A., et al., "Yards: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Villasenor, et al., "Configurable Computing Solutions for Automatic Target Recognition," IEEE, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Waingold, E., et al., "Baring it all to software: Raw machines," IEEE Computer, Sep. 1997, at 86-93.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, Markus et al., "Memory Access Optimization for Reconfigurable Systems," IEEE Proceedings Computers and Digital Techniques, 48(3) (May 2001) pp. 1-16.

Wittig, et al., "OneChip: An FPGA Processor with Reconfigurable Logic," IEEE, 1996, pp. 126-135.

Wolfe, M. et al., "High Performance Compilers for Parallel Computing" (Addison-Wesley 1996) Table of Contents, 11 pages.

Wu, et al., "A New Cache Directory Scheme," IEEE, pp. 466-472, Jun. 1996.

Xu, H. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.

Xilinx, "Logic Cell Array Families: XC4000, XC4000A and XC4000H," 1994, product description, pp. 2-7, 2-9, 2-14, 2-15, 8-16, and 9-14.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

\* cited by examiner

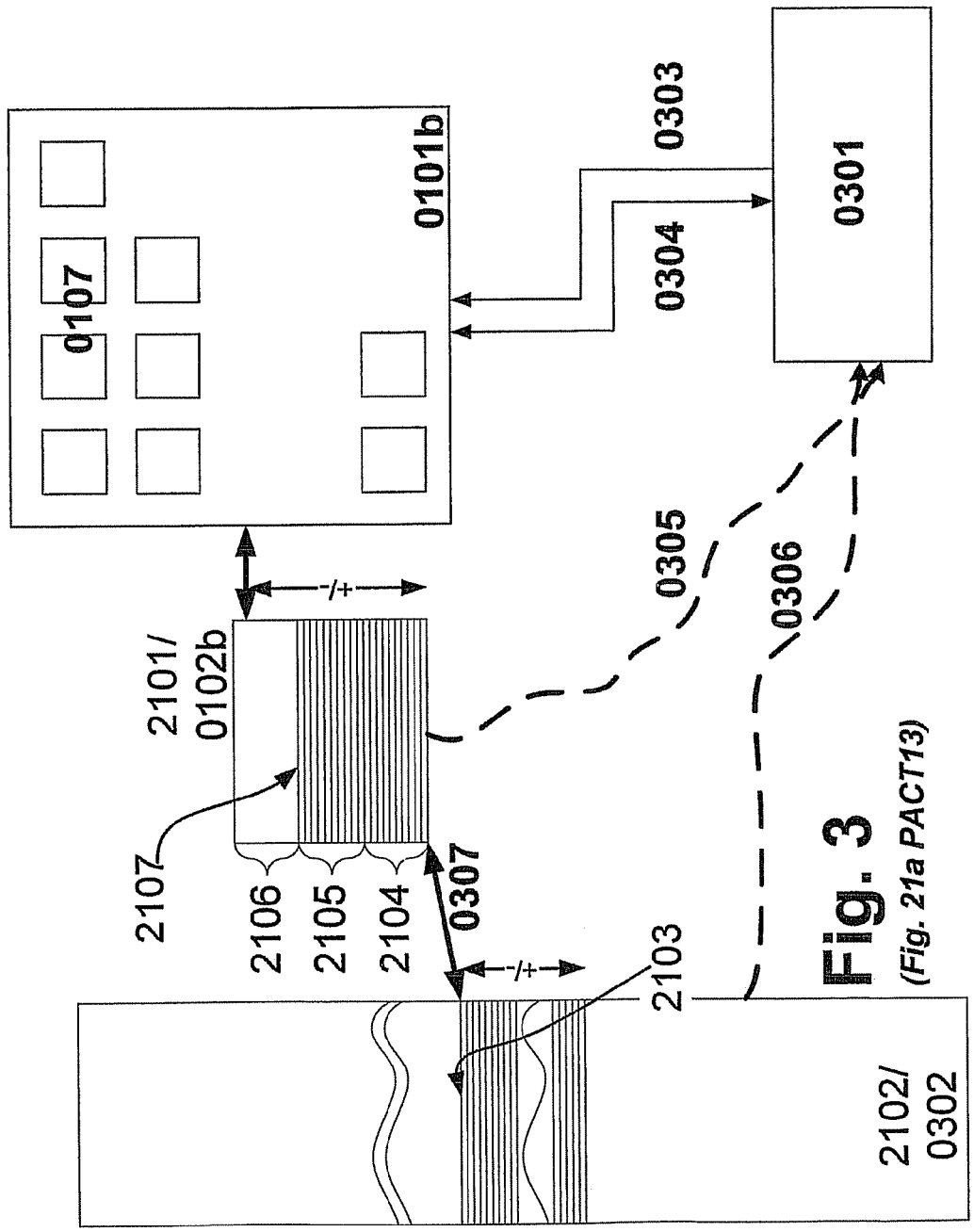

METHOD FOR DEBUGGING RECONFIGURABLE ARCHITECTURES

CROSS REFERENCE TO RELATED APPLICATIONS

This application is a continuation of and claims priority to U.S. patent application Ser. No. 10/487,687, filed on Aug. 25, 2004, now U.S. Pat. No. 7,480,825 and claims benefit of and priority to International Application Serial No. PCT/DE02/03278, filed on Sep. 3, 2002, which claims benefit of and priority to German Patent Application Serial No. 101 42 904.5, filed on Sep. 3, 2001, the entire contents of each of which are expressly incorporated herein by reference.

FIELD OF THE INVENTION

The present invention relates to methods for debugging programs on reconfigurable architectures.

BACKGROUND INFORMATION

Reconfigurable architecture refers to modules (VPUs) having a configurable function and/or interconnection, in particular integrated modules having a plurality of one-dimensionally or multidimensionally arranged arithmetic and/or logic and/or analog and/or memory and/or interconnecting modules (hereinafter referred to as PAEs) and/or communicative/peripheral modules (IOs) that are interconnected directly or via one or more bus systems. PAEs are arranged in any configuration, combination, and hierarchy. This system is referred to below as a PAE array or PA.

The generic class of such modules includes in particular systolic arrays, neural networks, multiprocessor systems, processors having a plurality of arithmetic units and/or logic cells, interconnection and network modules such as crossbar switches, as well as conventional modules of the generic types FPGA, DPGA, XPUTER, etc. In this connection, reference is made in particular to the following applications of the same applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, DE 102 06 856.9, 60/317,876, DE 102 02 044.2, DE 101 29 237.6-53, DE 101 39 170.6. These are herewith incorporated to the full extent for disclosure purposes.

In addition, it should be pointed out that the methods to be described here may be used for groups of multiple modules. Nevertheless, reference is made below to a VPU and/or to "modules." These modules and their operations are to be further improved.

SUMMARY

An object of the present invention is to provide something novel for commercial use.

A plurality of variants and hardware implementations (which make efficient debugging of VPU systems possible) are presented in the following.

1. Example Embodiments

In a preferred variant, debugging is performed either by using a microcontroller appropriately connected to a VPU or the module or by the load logic according to the patents P 44 16 881.0-53, DE 196 51 075.9, DE 196 54 846.2-53, DE 196 54 593.5-53, DE 197 57 200.6-33, DE 198 07 872.2, DE 101 39 170.6, DE 199 26 538.0, DE 100 28 397.7, the full content of which is herewith incorporated by this reference. As will be seen, however, other hardware variants may also be used.

The following basic methods may be used alternatively and/or jointly here:

1.1 Detecting a Debug Condition 1.1.1 Condition

The programmer defines, e.g., within the debugging tool, one or more conditions which start debugging (cf. breakpoint according to the related art). The occurrence of the conditions is detected at run time in the VPU and/or in any device exchanging data with the VPU. This preferably takes place due to the occurrence of certain data values with certain variables and/or certain trigger values with certain PAEs.

1.1.2 Precondition

In the optimum case, a certain condition according to the definition given above may already be defined by the programmer several cycles before the occurrence of the debugging condition. This precludes, from the beginning, certain latency problems which are discussed below.

Two fundamental types of debugging for VPUs are discussed below, the method preferred in each case depending on the choice of the compiler. Method A described below may be particularly suitable for compilers which generate code on the basis of instantiated modules of a hardware description language (or a similar language).

For compilers like those described in DE 101 39 170.6 and additional applications which generate complex instructions according to a method like VLIW, method B described below is particularly suitable. Generally, method B is the method preferred for operation of a VPU or a corresponding module as a processor or coprocessor.

It has been recognized that in particular the use of the two methods A and B together yields the best and most transparent debugging results. In particular, depending on the depth of the error to be debugged, it is possible to perform debugging first with the help of fast debugging method B, and then after adequate localization of the error, to analyze the details in depth by method A.

2. Method A 2.1 Basic Principle

After the occurrence of a (pre)condition, the VPU is stopped. The relevant debug information is then transferred from the PAEs to the debug program. The relevant debug information has previously been defined by the programmer within the debug program. After readout of all relevant debug information, the next cycle is executed and the relevant debug information is again read out. This is repeated until the programmer terminates the debugging operation. Instead of stopping the VPU, other methods are optionally also possible. For a given sequence of cycles, for example, data may be made available repeatedly for readout, if this is possible rapidly enough.

2.2 Support by the Hardware 2.2.1 Readout from the Registers

Essential for the functioning of the debugger is the possibility of reading back another externally connected (host) processor or a reserved area of array, the internal data registers, and/or status registers, and/or state registers, and optionally, depending on implementation, other relevant registers and/or signals from the PAEs and/or the network through a higher level unit (referred to below as a debug processor (DB)), i.e., a CT or a load logic, for example, and doing so only for selected registers and/or signals (referred to jointly below as debug information). Such a possibility is implementable, for example, with the connection created in PCT/DE 98/00334 between the load logic and the data bus of a PAE (PCT/DE 98/00334 0403, FIG. 4).

It should be pointed out explicitly that serial methods for readout of the registers may also be used. For example, JTAG may be selected, and the DB may also be connected via this method and optionally also as a separate external device, possibly a device that is commonly available on the market (e.g., from Hitex, Karlsruhe).

Since the debugger may have reading and/or writing access to all registers or at least a considerable number of them, it is optionally and preferably possible to omit a significant portion of the (serial) chaining of the registers for test purposes (scan chain) for the production tests of the chip. The scan chain is normally used to permit preloading of test data into all the registers within a chip during production tests and/or to permit the contents of the registers to be read back for test purposes. Preloading and/or reading back then typically take place through test systems (e.g., SZ Test Systems, Amerang) and/or according to the methods described in DE 197 57 200.6-33. The scan chain requires an additional not insignificant hardware complexity and surface area required for each register. This may now be eliminated at least for the registers that are debuggable, if, as proposed according to the present invention, production testing systems have access to the registers via suitable interfaces (e.g., parallel, serial, JTAG, etc.)

2.2.2 Stopping or Slowing down the Clock Cycle

The clock may either be stopped or slowed down due to the occurrence of the condition and/or precondition to make available enough time for readout. This debug start is triggered in particular either directly by a PAE that has calculated the (pre)condition(s) or by a higher-level unit (e.g., load logic/CT, host processor) on the basis of any actions, e.g., due to the information that a pre(condition) has occurred on a PAE and/or due to an action within the debug processor and/or through any program and/or any external/peripheral source. Trigger mechanisms according to P 44 16 881.0-53, DE 196 51 075.9-53, DE 197 04 728.9, DE 198 07 872.2, DE 198 09 640.2, DE 100 28 397.7 are available for information. Alternatively, the clock pulse may be slowed down in general in debugging. If only array parts are to be debugged, a partial slowing down of the clock pulse may also be provided.

If the clock pulse is slowed down, all the relevant debug information must be read out of the PAEs by the debug processor within the slowed-down cycle of the processing clock pulse. It is therefore appropriate and preferable to slow down the clock pulse only partially, i.e., to reduce or stop the working clock pulse but to continue the clock pulse for the readout mechanism. In addition, it is reasonable and preferable to supply the registers in general with a clock pulse for data preservation.

After stopping the clock pulse, a single-step mode may be implemented, i.e., the debug processor stops the processing clock pulse until it has read out all the debug information. It restarts the processing clock pulse for one cycle and then stops it again until all relevant debug information has been read out.

The readout clock pulse and the clock pulse of the debug processor are preferably independent of the processing clock pulse of the PAES, so that data processing is separated from debugging and in particular from readout of debug information.

In terms of the hardware, the clock pulse is stopped or slowed down by conventional methods, such as gated clocks and/or PLLs, and/or splitters or other methods. These means are preferably introduced at suitable locations (nodes) within the clock tree so that global clock control of the deeper branches is implementable. Slowing down the clock pulse of only selected array portions is described in the patent applications of the present applicant cited above.

It is particularly preferable for clock control information to be sent from a higher level unit, e.g., a load logic/CT, host processor) to all PAEs or to all PAEs that are to be debugged. This may be accomplished preferably via the configuration bus system. The clock control information here is typically transmitted by being broadcast, i.e., all PAEs receive the same information.

For example, the following clock control information may be implemented:

STOP: The working clock pulse is stopped.
SLOW: The working clock pulse is slowed down.
STEP: One processing step (single-step mode) is executed and then the working clock pulse is stopped again.
STEP (n): n processing steps are executed and the working clock pulse is stopped again.
GO: The working clock pulse continues normally.

The method for stopping and/or slowing down the clock pulse may also be used to reduce power consumption. If no computing power is needed at the moment, a "sleep mode" may be implemented by switching off the working clock pulse (STOP), for example, or through special instructions (SLEEP). If the full computing power is not needed, the clock pulse may be slowed down by using SLOW and/or temporarily suspended by using STEP(n). To this extent, this method may be used optionally and/or in addition to the methods described in German Patent Application No. DE 102 06 653.1 for reducing the power loss in particular.

One problem in broadcasting clock control information is the transmission time of the broadcast through the array of PAEs. At higher clock pulse frequencies, the transmission cannot take place within one working clock cycle. However, it is obligatory for all PAEs to respond to the clock control information at the same time. The clock control information is therefore preferably transmitted over a pipelined bus system similar to the CT bus system described in German Patent Application No. DE 100 28 397.7. In addition, a numerical value (LATVAL) is appended to the clock control information, this numerical value being equal to or greater than the maximum length of the pipeline of the bus system. The numerical value is decremented in cycles in each pipeline step (subtraction of 1). Each PAE receiving clock control information also decrements the numerical value with each clock pulse. This ensures that the numerical value in the pipelined bus system and the PAEs that have already received the clock control information is always exactly the same. If the numerical value reaches a value or 0, this ensures that all the PAEs have received the clock control information. The clock control information then goes into effect and the behavior of the clock pulse is modified accordingly.

Another latency time occurs due to the method described here. This latency may be additionally supported through the register pipeline which is described in greater detail below or, as is particularly preferred, by the definition of the (pre) condition by setting the (pre)condition forward to the extent that the latency time is already taken into account.

The latency time in the single-step mode is negligible because it plays a role only in the shutdown of the clock pulse (STOP). Since the STEP instruction always executes only one step, there is no corruption (delay) of the debug data due to the latency time during single-step operation.

2.2.3 Register Pipeline for Compensating for Latency

At higher operating frequencies, there may be a latency time between detecting the debug start and stopping or slowing down the clock pulse. This latency time is precisely predictable because the position of the delaying registers in the VPU is defined by the hardware and/or by the algorithm to be debugged and is therefore exactly calculable by the debugger.

However, due to the latency time, the information made available to the debug processor is shifted, so it is no longer possible to read out the correct debug information. This problem is preferably solved by a suitable definition of the (pre) condition by the programmer. By inserting a multistage register pipeline which transmits the debug information further by one register in each clock pulse, the debug processor is optionally able to use as many cycles of debug information as the register pipeline is long. The length of the register pipeline is to be designed to correspond to the maximum expected latency. Because of the precise calculability of the latency time, the debug program is now able to read the timely correct and relevant debug information out of the register pipeline.

One problem which occurs in using register pipelines is that they are relatively long and are thus expensive, based on the silicon surface area required for implementation.

2.3 Visible Debug Information

In this method, debugging is generally performed after occurrence of the (pre)condition because only thereafter is the clock pulse slowed down or stopped and the debug information read out. Debug information prior to occurrence of the (pre)condition is therefore not visible at first.

However, it is also possible, although this also involves a loss of performance, to operate a VPU at a slowed clock pulse or in single-step mode directly from the start of an application. The relevant debug information is then read out by the debug processor from the start.

3. Method B

3.1 Basic Principle

Relevant debug information from the memory units, which includes the application data and states of a certain working step in accordance with P 44 16 881.0-53, DE 196 54 846.2-53, DE 199 26 538.0, DE 101 39 170.6 as well as their additional applications and DE 101 10 530.4, is transmitted to the debug program. These memory units, hereinafter also referred to as working memories, operate more or less as registers for storing data which has been calculated within a configuration cycle in the PA or parts of the PA, in the machine model according to P 44 16 881.0-53, DE 196 54 846.2-53, DE 101 39 170.6 and their additional applications DE 199 26 538.0 and DE 101 10 530.4. Reference is made in particular to German Patent Application No. DE 101 39 170.6 and its additional applications which describe in detail the use of the memory units as registers (REG) for implementation of a processor model. The full content of DE 101 39 170.6 and its additional applications are herewith included for disclosure purposes. A memory unit here includes any arrangement and hierarchy of independent and dependent memories. It is possible to execute simultaneously a plurality of different algorithms on the PA (processing array), which then use different memories.

It is essential for the use of this method that data and/or algorithmically relevant states are stored in the memory units assigned to the PAEs, one memory unit in each case being of such size that all the relevant data and/or states of a cycle may be stored there. The length of a cycle may be determined by the size of the memory unit, which it preferably actually is (see DE 196 54 846.2-53). In other words, the cycle length is adapted to the hardware.

Different data and/or states are stored in the memory units in such a way that the latter may be assigned unambiguously to the algorithm. The debugger is therefore able to unambiguously identify the relevant data and/or states (debug information).

The relevant debug information may be determined by the programmer within the debug program—in particular also in advance. This debug information is read out of the memory units. Different methods are available for this, and a few possibilities are discussed in greater detail below. After readout of all relevant debug information, the next configuration cycle is executed and the relevant debug information is again read out. This is repeated until the programmer/debugger aborts the debugging procedure.

In other words, the relevant data and/or status information is not transmitted to the debugger in cycles but instead according to the configuration. It is read out of the memory units that are comparable to the registers of the CPU.

3.2 Support by the Hardware

For the mode of operation of the debugger, it is essential for the CT or another externally connected processor (referred to below as the debug processor (DB)) to be able to read the internal working memory (memories) of the VPU, for example. Such a possibility is provided, for example, by connecting the CT to the working memory for preloading and reading the data and/or by the method described in DE 199 26 538.0 for writing the internal memory to external memories. In one possible embodiment, the working memory may be accessed by various methods of the related art (e.g., shared memory, bank switching) by the debug processor, so that data exchange with the DB may take place largely independently of any other data processing in the VPU.

In one possible embodiment, the clock pulse of the VPU may optionally be either retarded or stopped for readout of the memory, e.g., according to method A by one or more of the measures described above and/or it may optionally be operated in a single-step mode. Depending on the implementation of the working memory, e.g., in the bank switching method, it is possible to eliminate a separate intervention involving the clock pulse. The clock pulse is typically stopped or slowed down according to method B and the working memories are read out and/or copied and/or switched only when a data processing or configuration cycle is ended.

In other words, an important advantage of method B is that it does not require any particular support by the hardware.

In one possible embodiment, a DB need only have access to the working memory. In an example embodiment which is particularly preferred, the working memory is accessed through a suitable configuration of the VPU, which therefore reads out the working memories automatically and without modification and transmits this information to a DB.

3.3 Access to Debug Information

Patents and patent applications P 44 16 881.0-53, DE 196 54 846.2-53, DE 101 39 170.69, DE 199 26 538.0 describe data processing methods in which a set of operations is mapped cyclically onto a reconfigurable data processing module. In each cycle, a plurality of data originating from a peripheral source and/or an internal/external working memory and written to a peripheral source and/or an internal/external working memory is calculated. Different working memories and/or in particular a plurality of independent working memories may be used at the same time. For example, in this data processing method, the working memories or some of the working memories function as register sets.

According to DE 101 39 170.6 and DE 199 26 538.0, all data and states relevant for further data processing are stored in the working memory and/or read out of same. In a preferred method, states irrelevant for further data processing are not stored.

The differentiation between relevant and irrelevant states is to be illustrated using the following example, although for disclosure purposes, reference is made in particular to the discussion in DE 101 39 170.6.

The state information of a comparison is essential for further processing of data, for example, because it determines the functions to be executed.

A sequential divider is formed, for example, by mapping a division instruction onto hardware that supports only sequential division. This results in a state which characterizes the computation step within division. This state is irrelevant because the algorithm needs only the result (i.e., the division performed). Therefore, in this case, only the results and the time information (i.e., the availability) are needed.

The time information is available from the RDY/ACK handshake in the VPU technology according to P 44 16 881.0-53, DE 196 51 075.9-53 and DE 199 26 538.0, for example. However, it should be pointed out here in particular that the handshake itself likewise does not constitute a relevant state because it merely signals the validity of the data, so that the remaining relevant information is in turn reduced to the existence of valid data.

DE 101 39 170.6 shows a differentiation between locally relevant states and globally relevant states:
Local: The state is relevant only within a single closed configuration. Therefore, this state need not necessarily be stored.
Global: The state information is needed for a plurality of configurations. This state must be stored.

It is possible that the programmer might want to debug a locally relevant state that is not stored in the memories. In this case, the application may be modified to create a debug configuration (equivalent to the debug code of processors), having a modification of the "normal" code of the application so that this state is additionally written into the memory unit and is therefore made available to the debugger. This results in a deviation between the debug code and the actual code which may result in a difference in the performance of the codes.

In a particularly preferred embodiment, no debugging configuration is used. Instead, the configuration to be debugged is terminated so that the data additionally required for debugging purposes outlasts the termination, i.e., it remains valid in the corresponding memory locations (REGs) (e.g., registers, counters, memories).

If the configuration to be debugged is terminated in such a way that the data additionally required for debugging purposes outlasts the termination, it is possible to perform debugging easily by not loading the next configuration required in a normal program sequence, but loading instead a configuration through which the data required for debugging purposes is transmitted to the debugging unit, i.e., the debugging means. It should be pointed out that in such debugging, the data required for debugging purposes may always be stored even later in the program run, thereby ensuring that the program which has been executed later has been subject to a debugging process in exactly the same way as required. Normal program execution may continue after readout of the debug information by a dedicated debugging configuration.

A configuration is loaded which connects the REGs in a suitable manner and in a defined order to one or more global memories to which the DB has access (e.g., working memories).

It is thus proposed that a configuration is loaded which connects the REGs in a suitable manner and in a defined order to one or more global memories to which the DB has access (e.g., working memories).

The configuration may use address generators, for example, to which the global memory (memories) has/have access. The configuration may use address generators, for example, to access REGs designed as memories. According to the configured connection between the REGs, the contents of the REGs are written in a defined order into the global memory, the particular addresses being predetermined by address generators. The address generator generates the addresses for the global memory (memories) in such a way that the described memory areas (DEBUGINFO) may be unambiguously assigned to the remote configuration to be debugged.

This method corresponds to the context switch described in DE 102 06 653.1 and DE 101 39 170.6, the full content of which is incorporated here for disclosure purposes.

The DB may then access data within a memory area (DEBUGINFO) which is accessible to it. If debugging is to be performed by a single-step method, a context switch may be performed after each single step of a configuration to be debugged, so that all data is preserved and the information to be debugged is written out of the REGs and into a working memory. While preserving the data, the configuration to be debugged is then reconfigured again and prepared for another single step. This is done for each single step to be debugged of the configuration to be debugged. Reference is made here to the possibility of debugging using the principles known as "wave reconfiguration."

3.4 Visible Debug Information

Debugging before the (pre)condition may be performed easily and without any great loss of performance because the required debug information is available in working memories. The debug information may be secured in a simple manner by transferring the working memories to other memory areas to which the DB preferably has direct access. An even faster method is to switch the working memories by a bank switching method (according to the related art) between the individual configurations so that the debug information is always in a new bank. This switching may take place in a very time-optimizing manner, in the optimum case even without any effect on the processing performance.

It has already been disclosed that in a VPU, data may be transferred by blocks into a memory area, which may also be located outside of the actual PA and/or may have a dual-ported RAM or the like, so that it is readily possible to externally access the information thus written.

4. Mode of Operation of the Debugger

The debugger program itself may run on a DB outside of the PA. As an alternative, a VPU itself may form the DB according to the methods used with processors. To do so, a task switch or context switch (SWITCH) may be performed according to the description given in PACT11 (U.S. Published Application No. 2003-0056202). The debug information of the program to be debugged is saved together with the relevant data in a SWITCH and the debugger program, which analyzes the information and/or processes it interactively with the programmer, is loaded. Another SWITCH is then performed (in which the relevant information of the debugger is saved) and the program to be debugged is continued. It should also be mentioned that a partial area of the processor may be provided as a debugger.

The debug information is read by the debugger according to method A and/or B and is saved in a memory and/or memory area that is separate from the data processing and to which the DB preferably has direct access. The breakpoints and (pre)conditions are defined by the debugger program. The debugger program may also assume control of execution of the application, in particular the start of execution and the end of execution.

The debugger makes a suitable working environment available to the programmer, optionally with a graphical interface. In a particularly preferred embodiment, the debugger is integrated into a complex development environment with which it exchanges data and/or control information. In particular, the debugger may save the data read out of the working memories on a data medium (hard drive, CD-ROM) for any further processing and/or may run it within a network (such as Ethernet).

The debugger according to the present invention may also communicate with other tools and in particular other debuggers within a development environment described in DE 101 29 237.6-53. In a preferred embodiment, the control and/or definition of the debug parameters may be taken over from another debugger. Likewise, the debugger may make the debug information generated by it available to another debugger and/or may receive debug information from another debugger.

In particular, the determination of the occurrence of breakpoints and/or a (pre)condition may be implemented by another debugger and/or the units debugged by this other debugger. The debugger according to the present invention and the VPU then respond accordingly.

The other debugger may be in particular the debugger of another processor (CT or ARC in Chameleon, Pentium, AMD, etc.) connected to a VPU.

In particular, the other debugger may run on a processor connected or assigned to the VPU and/or it may be the processor assigned to the DB, e.g., a CT or ARC in Chameleon. In a particularly preferred embodiment, the particular processor may be a host processor such as that described in U.S. Patent Application Ser. No. 60/317,876 and/or DE 102 06 856.9, for example.

5. Evaluation of Methods

Method A is considerably more time- and resource-intensive than method B, which requires hardly any additional hardware, and also omits the time-consuming readout of debug information from the start of the application. Method B is therefore fundamentally preferable. Method B is preferred for compilers described in DE 101 39 170.6 and its related applications.

It has been recognized that in particular using methods A and B together yields the best and most transparent debugging results. In particular, depending on the depth of the error to be debugged, debugging may be performed first with the help of the fast debugging method B and then after adequate localization of the error, debugging may be performed by method A, which analyzes the details in depth.

6. Mixed-Mode Debugger

When using method B, which is particularly preferred, the problem may also occur that the visible information in the memories is insufficient.

Typically, detailed debugging may proceed as follows:
a) The visible debug information (PREINFO) before configuring a breakpoint-containing configuration is saved. If an error occurs in the breakpoint, a search is then conducted for visible debug information (POSTINFO). Based on the PREINFO information, a software simulator is started, simulating the configuration(s) to be debugged. The simulator may determine each value within the PAEs and the bus systems and output it (optionally also graphically and/or as text), thus providing a detailed insight into the sequence of the algorithm at the point in time when the error occurred. It is possible in particular to compare the simulated values in each case with the values from POSTINFO in order to rapidly recognize any differences.
b) The visible debug information before a breakpoint is saved. When a breakpoint occurs, a software visualizer is started based on this information. The module to be debugged is then operated in a single-step method to permit readout of all relevant data according to method A. This data may then be output either directly (including graphically and/or as text, if necessary) and/or relayed to a simulator whose simulation is then based on the more detailed data and may next be output in the known ways.

6.1 Advantages of a Mixed-mode Debugger

The mixed-mode debugger permits a detailed analysis of the sequences within a module. Due to the possibility according to method B of working at full speed up to a set breakpoint and then stopping, if necessary, slowing down and/or switching to a single-step mode, if necessary, the debugging becomes time-efficient, so it becomes possible to test large volumes of data and/or complex algorithms. The preferred use of a simulator after occurrence of the breakpoint on the basis of the current data and states permits detailed insight into the hardware. If the time required for the simulation is too long and/or a 100% correspondence of the simulator to the hardware is questionable, then reading back the data in the single-step mode after occurrence of a breakpoint according to method A or according to the context switching method according to DE 102 06 653.1 and DE 101 39 170.6 permits 100% correct debugging of the algorithm and/or the hardware itself.

BRIEF DESCRIPTION OF THE DRAWINGS

FIG. 3 shows a possible schematic structure of a debugging.

DETAILED DESCRIPTION OF EXAMPLE EMBODIMENTS

Figure 1:
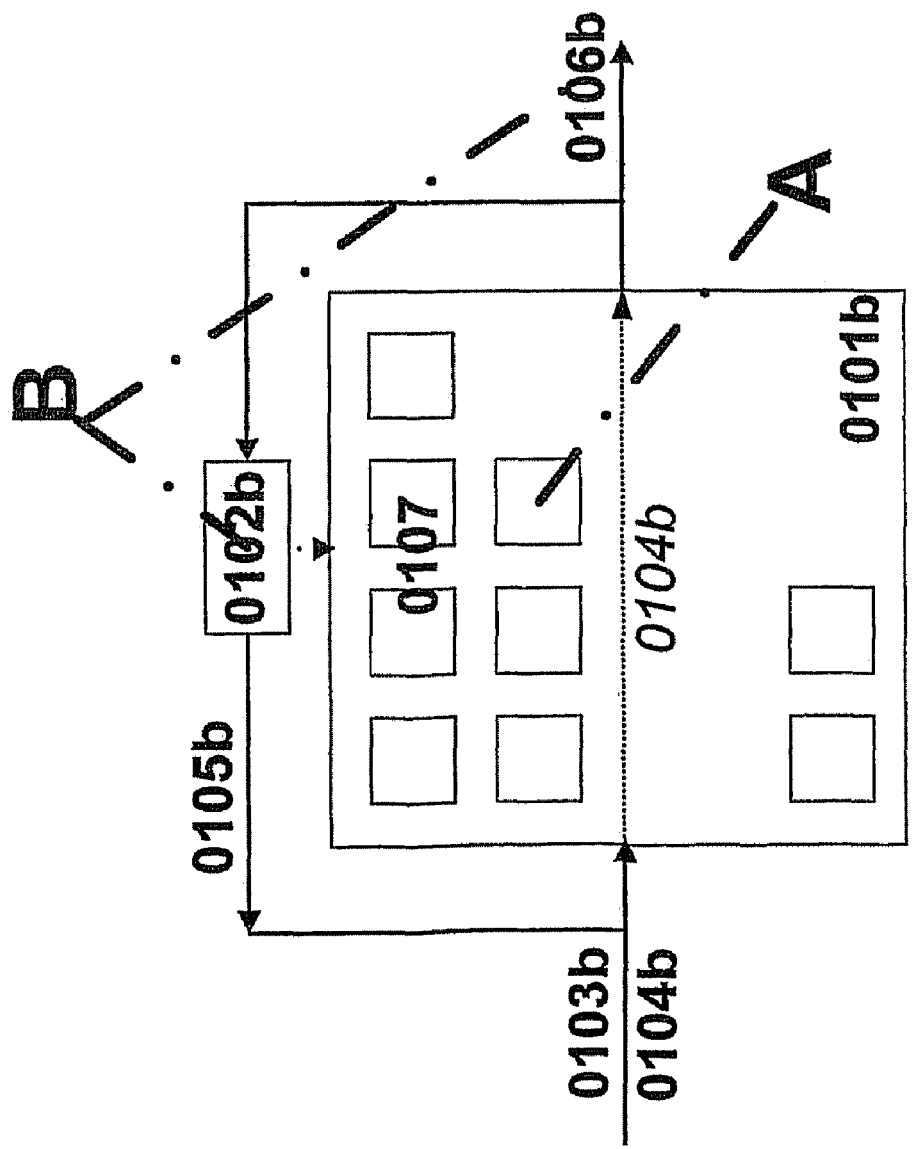
FIG. 1b illustrates a representation of a finite automaton by a reconfigurable architecture.
Figure 2:
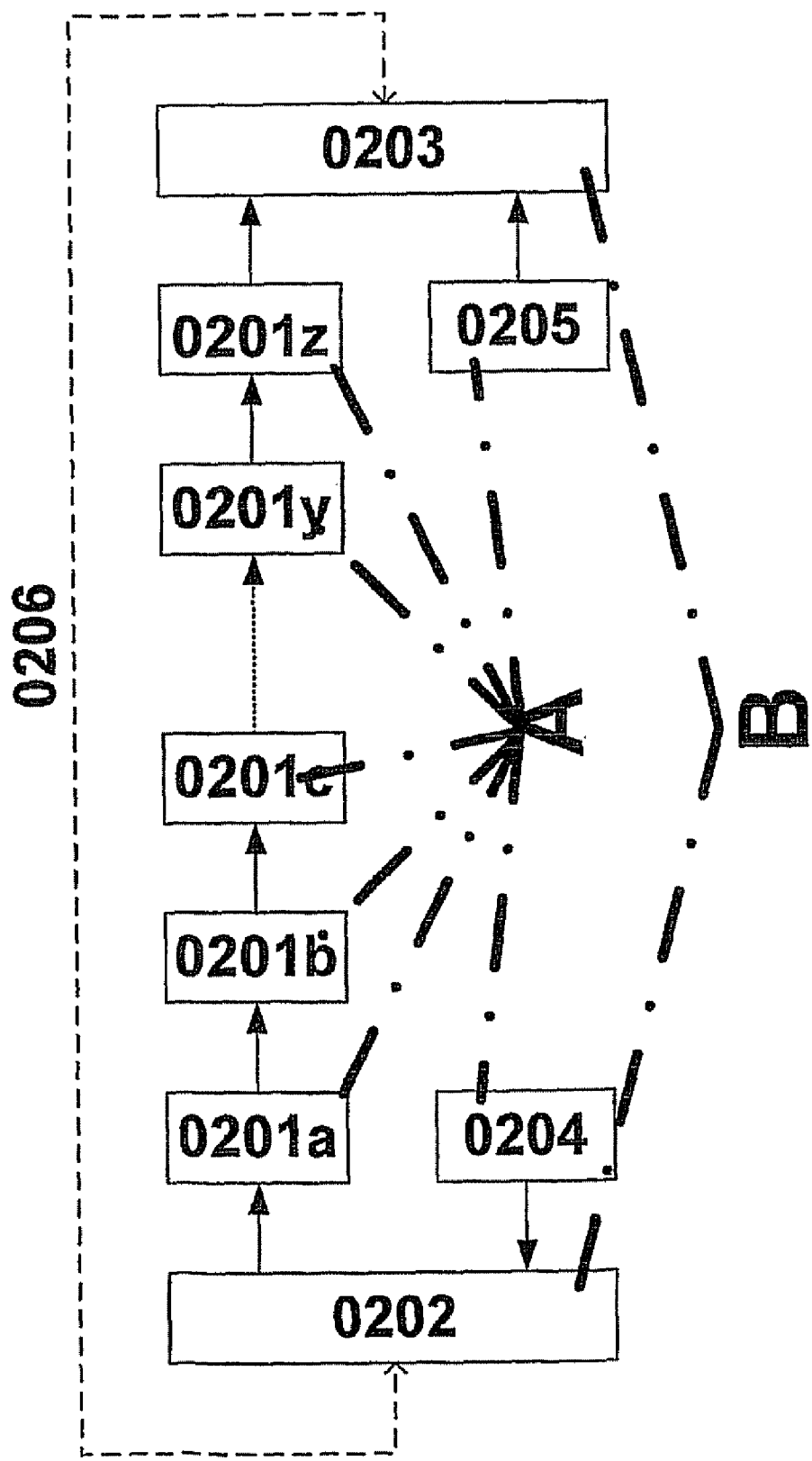
FIG. 2 illustrates a finite automaton mapped on a reconfigurable architecture

FIGS. 1 and 2 generally correspond to German Patent Application No. DE 101 39 170.6. The different approaches of methods A and B are indicated in the figures (A, B).

FIG. 1b shows a representation of the finite automaton by a reconfigurable-architecture described in P 44 16 881.0-53 and DE 196 54 846.2-53 (DE 196 54 846.2-53, FIGS. 12 through 15). The combinatory network of FIG. 1a (0101) is replaced by a system of PAEs 0107 (0101b). Register (0102) is embodied by a memory (0102b) capable of storing a plurality of cycles. Feedback according to 0105 takes place through 0105b. Inputs (0103b and 0104b) are equivalent to 0103 and 0104, respectively. Direct access to 0102b may be implemented through a bus via array 0101b, if necessary. Output 0106b is in turn equivalent to 0106.

FIG. 2 shows an illustration of a finite automaton mapped on a reconfigurable architecture, 0201(x) representing the combinatory network (which may be embodied as a PAE according to FIG. 1b). There are one or more memories for operands (0202) and one or more memories for results (0203). Additional data inputs/outputs (0103b, 0104b, 0106b) are not shown for the sake of simplicity. An address generator (0204, 0205) is assigned to each memory.

Operand and result memories (0202, 0203) are linked together physically or virtually so that the results of a function may be used as the operands of another memory and/or results and operands of a function may also be used as the operands of another memory. Such a linkage may be established through bus systems, for example, or via (re)configuration whereby the function and interconnection of the memories with 0201 are reconfigured.

FIG. 3 shows a possible schematic structure of the debugging according to method B. Reference should be made in particular to FIGS. 19, 20 and 21 of German Patent Application No. DE 199 26 538.0 in which the basis of the memories is described. The full content of DE 199 26 538.0 is herewith incorporated for disclosure purposes.

0101b and 0102b are shown as already described. In addition, an external memory unit (0302) is also shown which may be connected (0307) to 0102b, as in DE 199 26 538.0. Both 0102b and 0302 may be external or internal memory units. Likewise, one memory unit should be defined as at least one register, a set of registers or a memory (RAM, flash, etc.) or a bulk memory (hard drive, tape, etc.).

Debugging unit 0301 may set breakpoints within 0101b (0303) on the basis of which the actual debugging operation is triggered. On reaching a breakpoint, information (0304) is sent to 0301, starting the debugging operation. At the same time, all procedures for debugging (e.g., stopping and/or slowing down the cycle) within 0101b are triggered. As an alternative, information may also be generated through 0301 and sent to 0101b. Via 0305 and/or 0306, it is possible for 0301 to access the data or states from memory 0102b and/or memory 0302. The access may take place, for example,
1. via memory linkage (block move, i.e., copying the memory into another area controlled by 0301),
2. via a line (serial or parallel line over which one or more memory areas are transmitted, e.g, JTAG),
3. via bus linkages, regardless of the type (the memories are arbitrated as in a DMA method and are processed by 0301).

A figure from DE 199 26 538.0 has been selected as an example. It should be pointed out explicitly that generally any memory and any memory linkage (stack, random access, FIFO, etc.) may be processed accordingly.

Figure 4B:
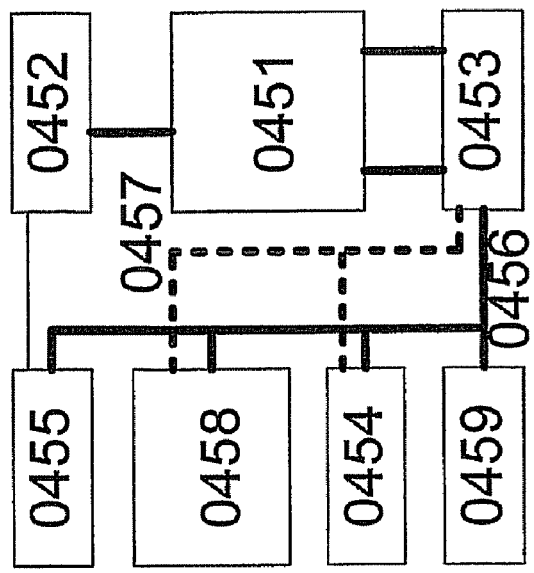
FIG. 4b shows the detail of an exemplary CPU system.
Figure 4A:
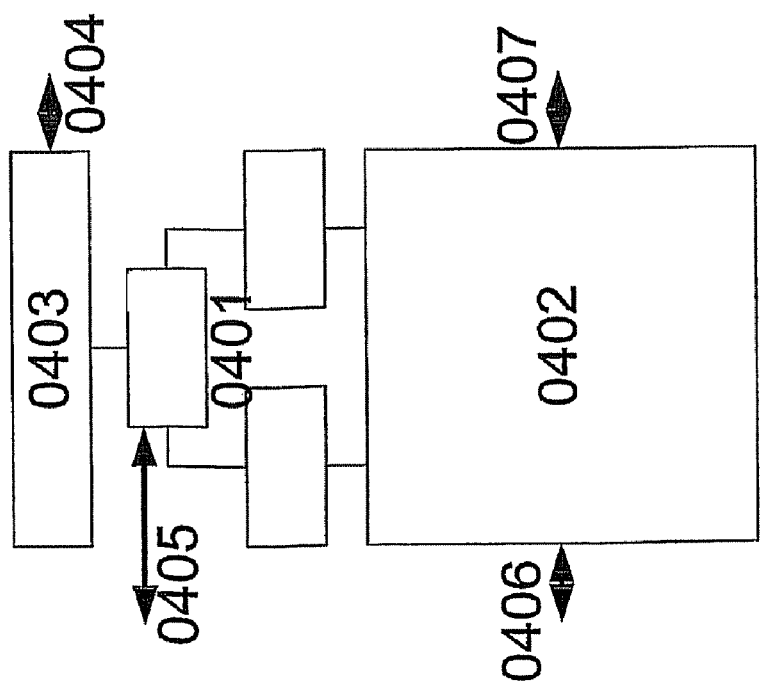
FIG. 4a shows the structure of a particularly preferred VPU.

FIGS. 4a and 4b show other possible embodiments; these have been described in German Patent Application No. DE 102 06 856.9, the full content of which is herewith included for disclosure purposes.

FIG. 4a shows the structure of a particularly preferred VPU. Preferably hierarchical configuration managers (CTs) (0401) control and manage a system of reconfigurable elements (PACs) (0402). The CTs are assigned a local memory for configurations (0403). The memory also has an interface (0404) to a global memory which provides the configuration data. The configuration sequences are controllable via an interface (0405). An interface of reconfigurable elements (0402) for sequence control and event management (0406) is provided; likewise there is an interface for data exchange (0407). For example, one CT may function as a DB.

FIG. 4b shows a detail of an exemplary CPU system, e.g., a DSP of the C6000 type from Texas Instruments (0451). This shows program memory (0452), data memory (0453), any peripheral (0454) and EMIF (0455). A VPU is integrated as coprocessor (0458) via a memory bus (0456) and a peripheral bus (0457). A DMA controller (EDMA) (0459) may perform any DMA transfers, e.g., between memory (0453) and VPU (0458) or memory (0453) and periphery (0454). In this example, 0451 may function as a DB and in particular the debugger according to the present invention may also be connected to and/or integrated into its debugger.

Figure 5A:
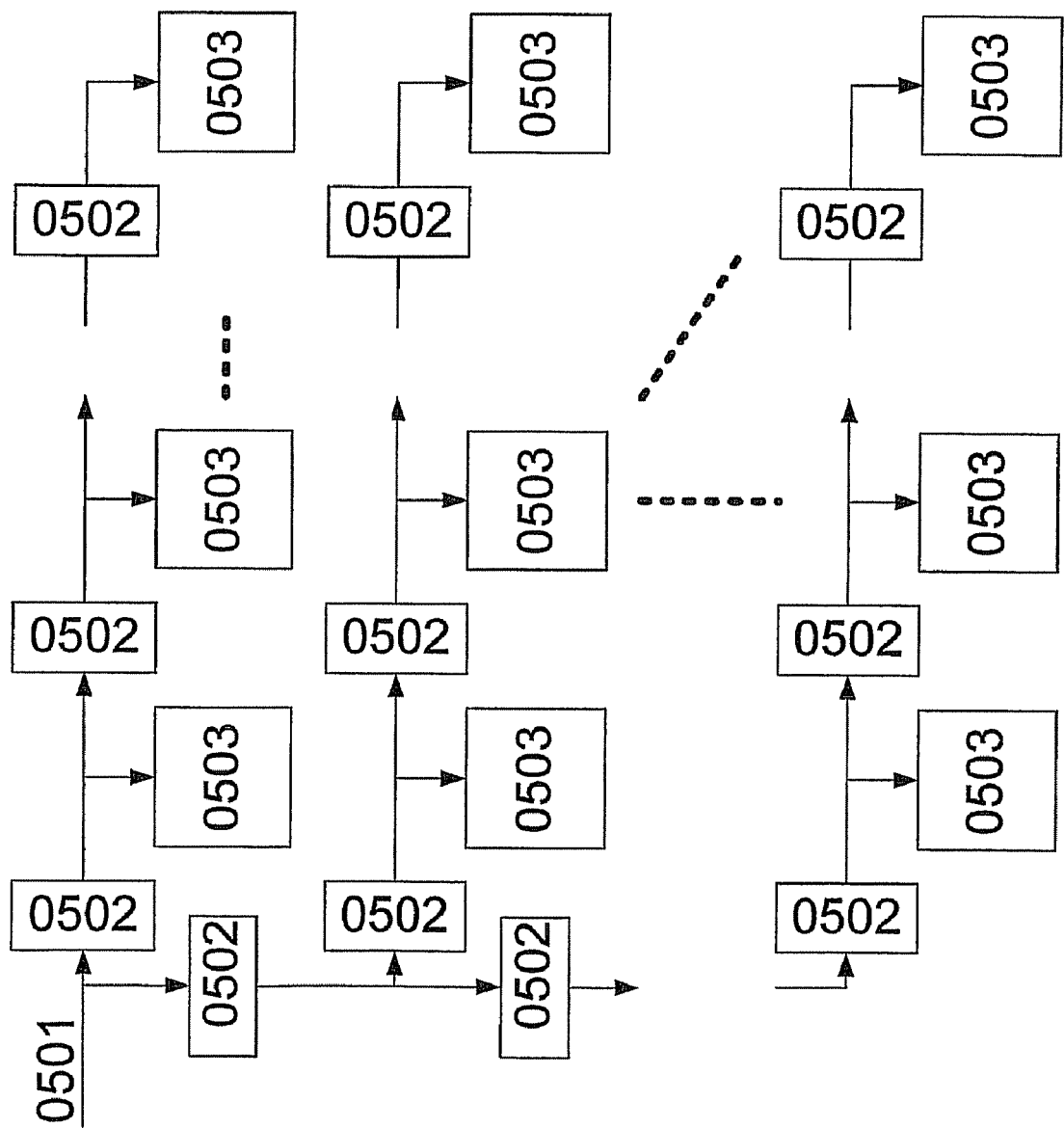
FIG. 5a shows an exemplary hardware design that may be used for debugging reconfigurable processors.

FIG. 5a shows an exemplary hardware design that may be used for debugging reconfigurable processors. A pipelined configuration bus 0501 like that described in DE 100 28 397.7 is used for this purpose. The pipeline is composed of a plurality of register stages (0502) in the horizontal and/or vertical direction to achieve higher clock pulse frequencies. The pipelined configuration bus is connected to configuring elements (PAEs) (0503) to supply them with configuration data.

Figure 5B:
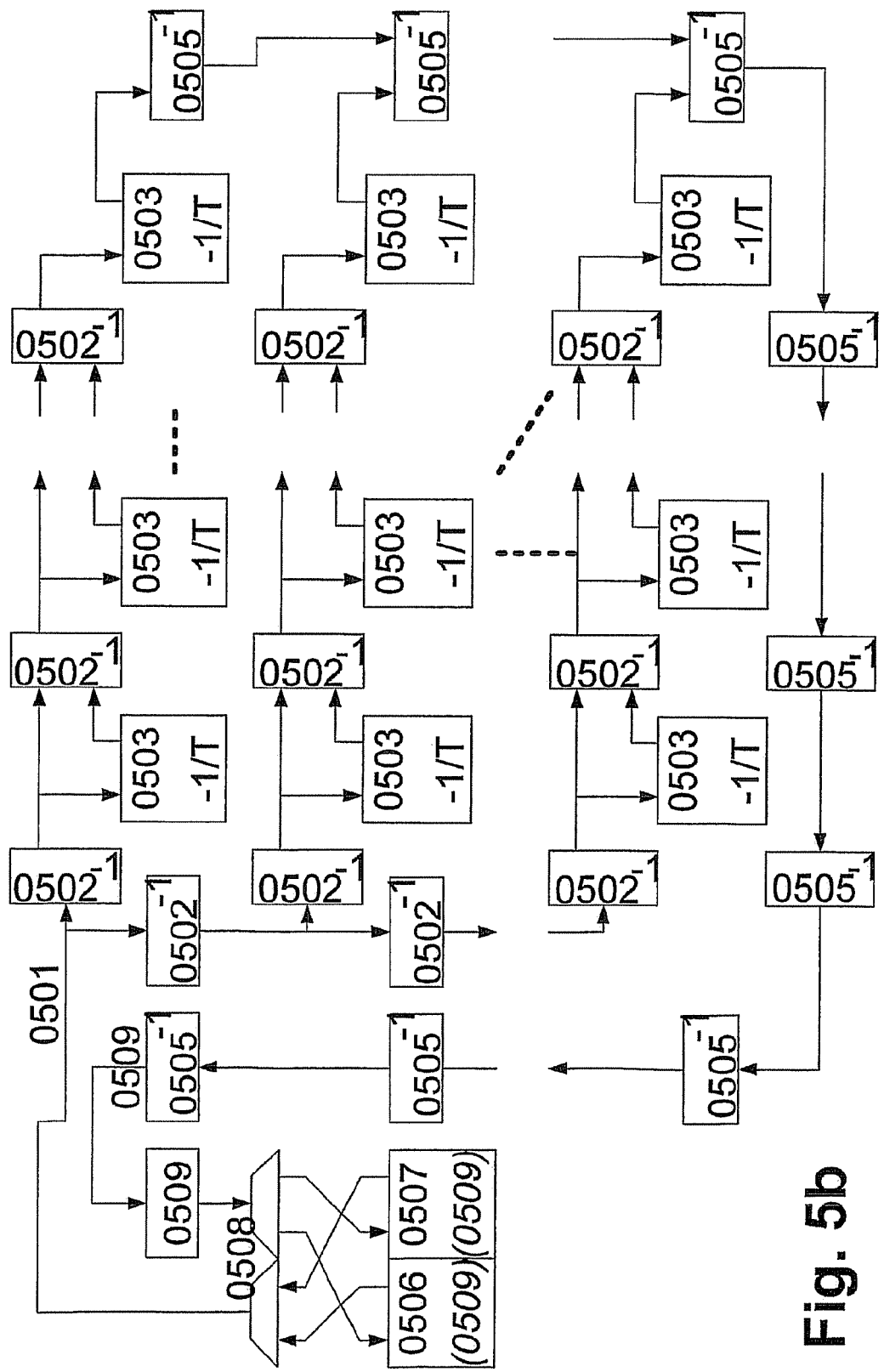
FIG. 5b shows as an example the expansion according to the present invention.

FIG. 5b shows as an example the expansion according to the present invention. Each register stage (0502) decrements the numerical value (LATVAL) by one (indicated by −1) to compensate for the latency time. Likewise, each PAE (0503), which has already received clock control information, decrements it by one per cycle (indicated by −1/T). It is then possible to have not only write access but also read access to the PAEs and in particular to their internal registers, e.g., via a special control line (RD) to read out debug data. In this example, data to be read and written passes through the bus system through the arrays of PAEs from left to right and in the reverse direction in the bottom row. The configuration bus is also connected back (0504) like a pipeline via register stages (0505). In this example, a higher-level unit (CR/load logic, host processor) (0506) may also have read and write access to the bus like a dedicated test interface (0507). The test interface may have its own test controller and in particular may be compatible with one or more test interfaces available on the market (e.g., JTAG, Tektronix, Rhode & Schwarz, etc.). The choice of the bus controlling unit is made via a multiplexer/demultiplexer unit (0508). A circuit for back-calculating the source address (0509) of debug data arriving via 0504 may be provided in 0509 (shown in parentheses and in italics) or upstream from units 0506 and 0507. The address calculations within the system shown here are performed as follows: first, the address is applied to bus 0501 through 0506 or 0507. Like the processing of numerical values (LATVAL) for the latency computation, the address is decremented in each register stage (0502 and 0505). As soon as the address is equal to 0, the PAE after the register stage is selected. In the following register stage the address becomes negative so that no other PAEs are activated. If data is read out of a PAE, it is transmitted again together with the address. The address is decremented further in each register stage. A reverse calculation in 0509 of the addresses arriving at 0506 and/or 0507 together with the debugging data is now possible via a simple addition, by adding the number of decrementing register stages to the incoming address value. It should be pointed out that register stages 0502 in FIG. 5b are designed to be easily distinguishable from register stages 0502 in FIG. 5a. Namely, in FIG. 5b, they additionally have a circuit (e.g., multiplexer) for selecting the data to be relayed, either forwarding the data of bus 0501 or forwarding the output of the particular PAE (0503)

and thus the debugging data. The arrival of the address value equal to 0 may be used to trigger the circuit.

It is pointed out here again that dedicated test interface (0507) conforms to industry standards. It may be used for tests during the software debugging procedure and/or for testing during the assembly of hardware components and systems (e.g., assembling circuits on a circuit board) and/or for function tests of the semiconductor module (chip) as part of semiconductor fabrication. In particular, the usual scan chain may be omitted here for testing the register during the function test of the semiconductor or it may at least be minimized because then only the registers that are not triggerable by the bus system (0501) need pass through the scan chain.

Likewise, it is pointed out in particular that the method explained in conjunction with FIG. 5 is by no means limited to use with configuration buses. Ordinary data bus systems may also be used at the different test times and debugging times and types of test and debugging listed previously. In particular, reference should be made in this connection to the data bus system in DE 197 04 742.4. DE 197 04 742.4 is herewith incorporated fully for disclosure purposes. The methods described in conjunction with FIG. 5, easily understandable for an engineer having ordinary technical expertise, may also be applied to DE 197 04 742.4.

Mixed operation of different bus systems such as configuration bus systems, data bus systems according to DE 197 04 742.4 and ordinary data bus systems is also fundamentally possible. Therefore a plurality of test interfaces may be provided or (and this option is technically preferable) multiplexer/demultiplexer stage (0508) may be designed for a plurality of bus systems (n×0501, n×0504).

In conclusion, it should also be mentioned in particular that by connecting back the bus system according to FIG. 5b, the configuration data which is also to be written into the PAEs is also returned. Use of the configuration buffer memory FIFOs according to DE 100 28 397.7 (FIGS. 8 and 9 (0805, 0903)) may be omitted with the help of the address back-calculation (0509) and returned status line REJ, which indicates rejection of the configuration according to DE 100 28 397.7, DE 198 07 872.2, DE 196 54 593.5-53 because their functionality is now mapped completely via the bus system described here.

8. Definition of Terms

Locally relevant state State that is relevant only within a certain configuration.
Globally relevant state State that is relevant in a plurality of configurations and must be exchanged among the configurations.
Relevant state State that is needed within an algorithm for correct execution thereof and is thus described and used by the algorithm.
Irrelevant state State that is of no significance for the actual algorithm and is also not described in the algorithm but is needed by the hardware performing the execution as a function of the implementation.

What is claimed is:

1. A method for debugging a program running on reconfigurable hardware, comprising:
    writing debug information into a memory in each of a plurality of configuration cycles;
    analyzing, by a debugger, the debug information;
    loading a configuration, wherein the loading is performed during the debugging and responsive to occurrence of a debugging condition that indicates that information, regarding one of the configuration cycles, is needed; and
    using the loaded configuration, reading the debug information out of the memory.

2. The method as recited in claim 1, further comprising:
    altering a configuration to be debugged before the debugging in such a way that information not needed in normal non-debugging execution is stored in a memory.

3. The method as recited in claim 1, further comprising:
    writing the debug information into a debugging unit or a debugging configuration.

4. A method for debugging a program running on reconfigurable hardware, comprising:
    in each of a plurality of configuration cycles, configuring at least a portion of the reconfigurable hardware according to configurations defined by the program;
    writing debug information into a memory in each of the plurality of configuration cycles;
    analyzing, by a debugger, at least some of the debug information; and
    at least partially slowing down or stopping a clock pulse frequency for readout.

5. The method as recited in claim 4, wherein the at least partially slowing down and stopping the clock pulse is performed responsive to completion of each of a plurality of processing steps of a configuration cycle.

6. A method for debugging a program running on reconfigurable hardware, comprising:
    in each of a plurality of configuration cycles, configuring at least a portion of the reconfigurable hardware according to configurations defined by the program;
    writing debug information into a memory in each of the plurality of configuration cycles;
    analyzing, by a debugger, at least some of the debug information; and
    simulating one of the plurality of configuration cycles according to readout of relevant information or according to previously available information.

7. The method as recited in claim 6, wherein the simulating includes outputting simulated values of each of at least one configurable element of the reconfigurable hardware determined for the simulated configuration cycle.

8. A reconfigurable device, comprising:
    a field of configurable elements, the field including at least one of coarse-grained logic and arithmetic units;
    a debugging arrangement for debugging a program running on the reconfigurable device, the debugging arrangement including a memory, wherein the debugging arrangement is adapted to:
        write debug information into the memory in each of a plurality of configuration cycles in which one or more of the configurable elements is configured;
        load a configuration, wherein the loading is performed during a debugging procedure and responsive to occurrence of a debugging condition that indicates that information, regarding one of the configuration cycles, is needed; and
        using the loaded configuration, reading the debug information out of the memory; and
    an analysis device adapted to analyze the debug information.

9. The device as recited claim 8, wherein the memory is a dual-ported RAM having a first input for information to be saved from the field and a second input for readout of information into the analysis device.

10. A method for debugging a program running on hardware including modules that are reconfigurable in a configuration cycle with respect to at least one of function and interconnection, comprising:

in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
writing debug information into a memory; and
reading out of the memory the debug information for use by a debugger; and
analyzing by the debugger the debug information.

11. The method of claim 10, further comprising:
altering a configuration to be debugged before the debugging in such a way that information not needed in normal non-debugging execution is stored in a memory.

12. The method of claim 11, further comprising:
writing the debug information into a debugging unit or a debugging configuration.

13. The method of claim 11, further comprising:
at least partially slowing down or stopping a clock pulse frequency for readout.

14. The method of claim 10, further comprising:
at least partially slowing down or stopping a clock pulse frequency for readout.

15. The method of claim 14, further comprising:
writing the debug information into a debugging unit or a debugging configuration.

16. The method of claim 15, further comprising:
performing a cycle process of a configuration to be debugged, step by step.

17. The method of claim 10, further comprising:
performing a cycle process of a configuration to be debugged, step by step.

18. The method of claim 17, further comprising:
at least partially slowing down or stopping a clock pulse frequency for readout.

19. The method as recited in any of claims 10-18, further comprising:
simulating a configuration to be debugged according to readout of relevant information or according to previously available information.

20. A dynamically reconfigurable device, comprising:
a field of dynamically configurable elements, the field including at least one of coarse-grained logic and arithmetic units; and
a debugging arrangement to debug a program while executed on the field of configurable elements, wherein the debugging arrangement includes a memory to store information relevant to debugging during or at an end of a working step of the field of dynamically configurable elements;
wherein, in each of at least a subset of a plurality of configuration cycles (a) performed during execution of the program on the field of configurable elements, (b) during which at least a portion of the field of configurable elements are reconfigured with respect to at least one of function and interconnection, and (c) for which the information relevant to debugging is to be obtained, the debugging arrangement is configured to:
write the information relevant to debugging to the memory; and
read the information relevant to debugging out of the memory for debugging.

21. The device as recited in claim 20, wherein the memory is a dual-ported RAM having a first input for information to be saved from the field and a second input for readout of information into an analysis device.

22. A method for debugging a program running on hardware including modules that are reconfigurable in a configuration cycle with respect to at least one of function and interconnection, a plurality of configuration cycles being performed for the running of the program, at least a subset of the reconfigurable hardware modules being reconfigured in each of the plurality of configuration cycles with respect to the at least one of function and interconnection, the method comprising:
for at least a subset of the plurality of configuration cycles which occurs during a debugging operation:
following a first of the subset of the plurality of configuration cycles, prior to each subsequent one of the subset of the plurality of configuration cycles, transferring debug information from the reconfigurable modules into a memory;
reading out of the memory the debug information for use by a debugger; and
analyzing by the debugger the debug information.

* * * * *